(12) United States Patent
Kominami et al.

(10) Patent No.: US 11,530,040 B2
(45) Date of Patent: Dec. 20, 2022

(54) DISCHARGE DEVICE FOR AIRCRAFT

(71) Applicant: TOYO SEIKAN CO., LTD., Tokyo (JP)

(72) Inventors: Atsushi Kominami, Kanagawa (JP); Soji Araki, Kanagawa (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 0 days.

(21) Appl. No.: 17/437,126

(22) PCT Filed: Feb. 25, 2020

(86) PCT No.: PCT/JP2020/007414
§ 371 (c)(1),
(2) Date: Sep. 8, 2021

(87) PCT Pub. No.: WO2020/184166
PCT Pub. Date: Sep. 17, 2020

(65) Prior Publication Data
US 2022/0177133 A1    Jun. 9, 2022

(30) Foreign Application Priority Data

Mar. 8, 2019 (JP) .............................. JP2019-043205
Dec. 13, 2019 (JP) .............................. JP2019-225346

(51) Int. Cl.
*B64D 1/18* (2006.01)
*B64C 39/02* (2006.01)
(Continued)

(52) U.S. Cl.
CPC .............. *B64D 1/18* (2013.01); *B64C 39/024* (2013.01); *B65D 83/26* (2013.01); *B65D 83/38* (2013.01); *B64C 2201/128* (2013.01)

(58) Field of Classification Search
CPC .......... B64D 1/18; B64C 2201/12–128; B64C 39/024; B65D 83/386; B65D 83/38; B65D 83/26
See application file for complete search history.

(56) References Cited

U.S. PATENT DOCUMENTS 4,238,055 A * 12/1980 Staar .................... B05B 11/3052
                                                      222/162
9,776,200 B2 * 10/2017 Busby ................... B05B 9/0403
(Continued)

FOREIGN PATENT DOCUMENTS

JP    2012-040975 A    3/2012
JP    2017-104063 A    6/2017
(Continued)

OTHER PUBLICATIONS

Office Action in JP Application No. 2019-225346 dated Mar. 3, 2020, 10 pages.
(Continued)

*Primary Examiner* — Benjamin R Shaw
*Assistant Examiner* — Randall A Gruby
(74) *Attorney, Agent, or Firm* — Marshall, Gerstein & Borun LLP

(57) ABSTRACT

The present invention provides a discharge device for an aircraft, in which an aerosol container can easily be attached to an airframe and an operation for exchanging the aerosol container can be performed easily, resulting in a high degree of safety. A discharge device for an aircraft, to which an aerosol container can be attached and which discharges contents of the aerosol container when attached to an aircraft, is mounted on an airframe of the aircraft in a state where the aerosol container is housed in a housing member.

16 Claims, 19 Drawing Sheets

(51) Int. Cl.
 B65D 83/26 (2006.01)
 B65D 83/38 (2006.01)

(56) References Cited

U.S. PATENT DOCUMENTS 10,023,311 B2 * 7/2018 Lai ..................... G05D 1/0094
2016/0082460 A1   3/2016 McMaster et al.
2017/0259920 A1 * 9/2017 Lai ..................... B64C 39/024
2021/0061543 A1 * 3/2021 Murakami ............ B64C 39/024

FOREIGN PATENT DOCUMENTS

JP    2018-191610 A    12/2018
WO   WO-2019/138576 A1  7/2019

OTHER PUBLICATIONS

Search Report and Written Opinion in International Application No. PCT/JP2020/007414 dated May 12, 2020, 4 pages.

* cited by examiner

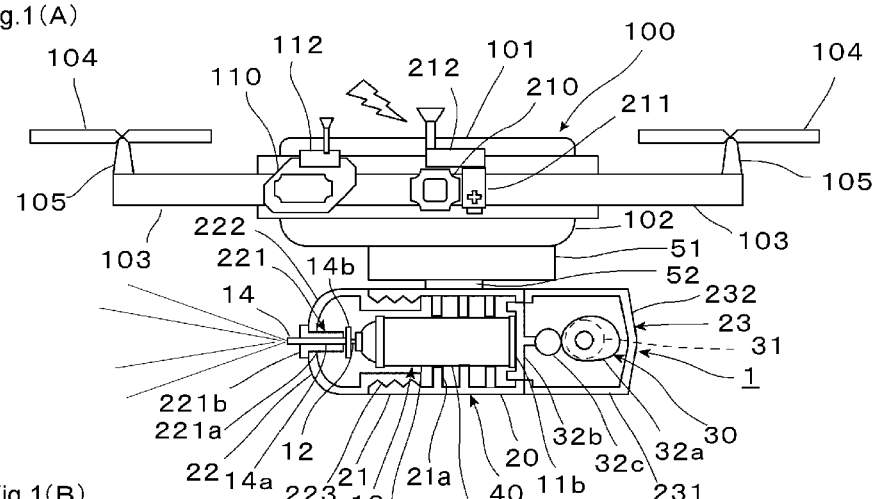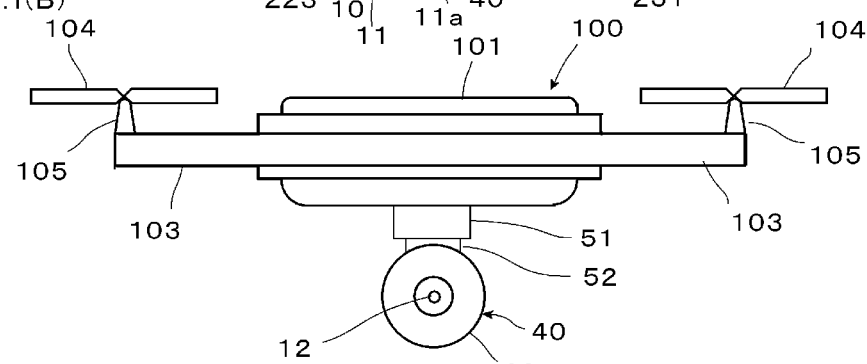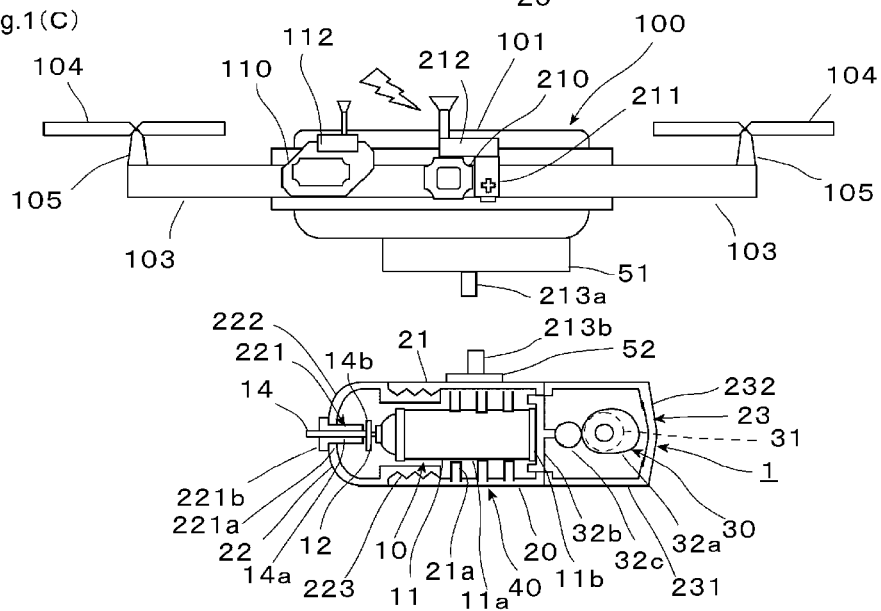

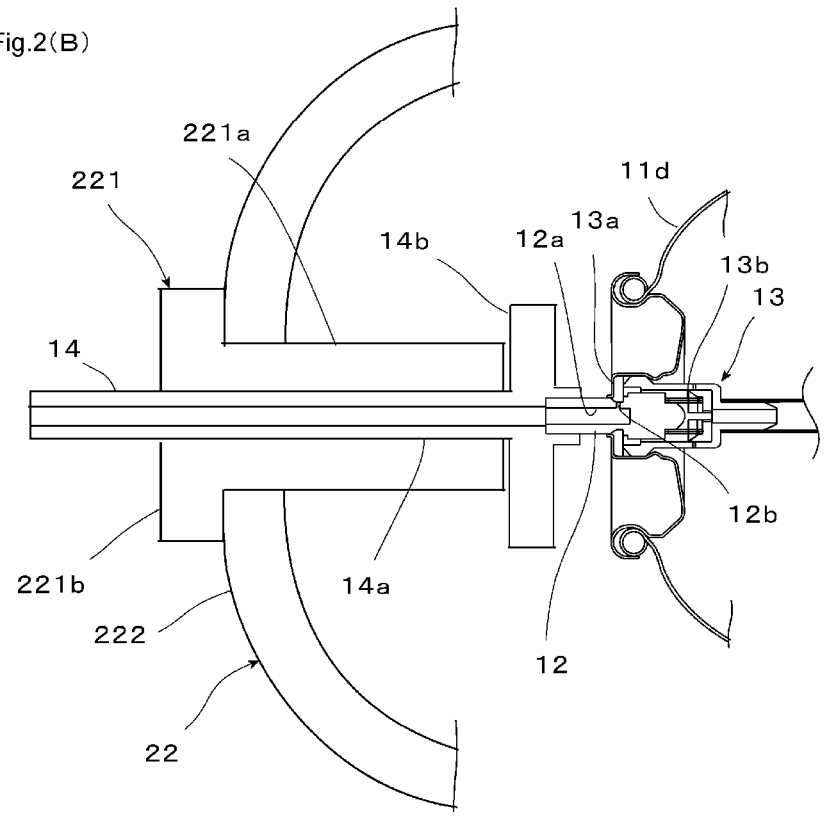
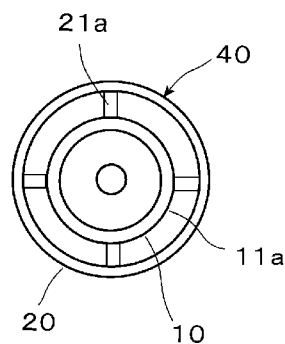
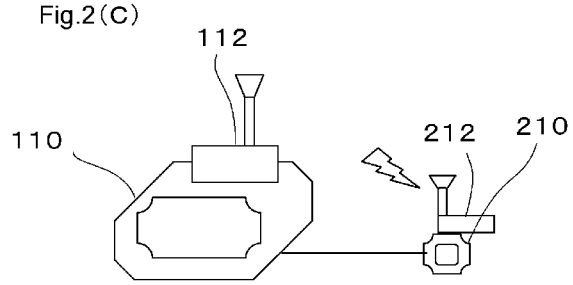
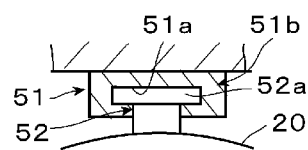

Fig.8(A)
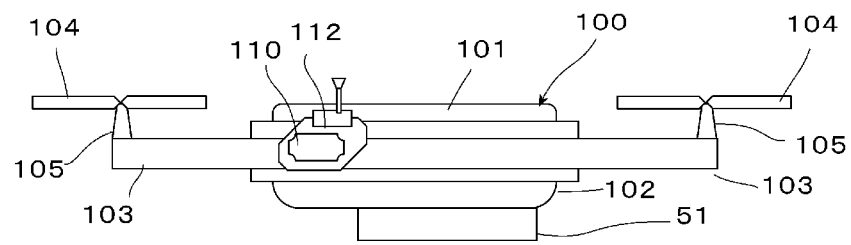
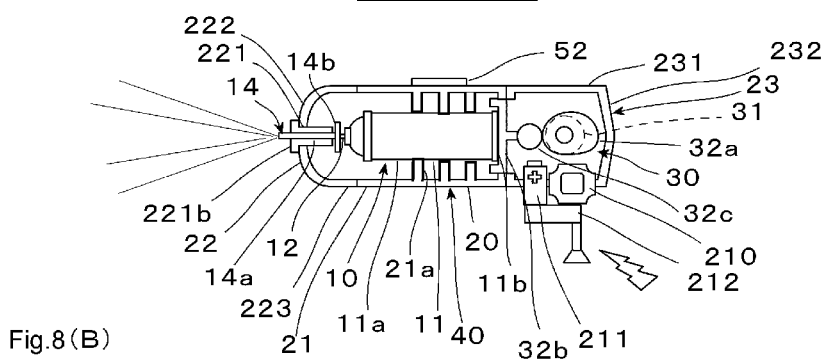
Fig.8(B)
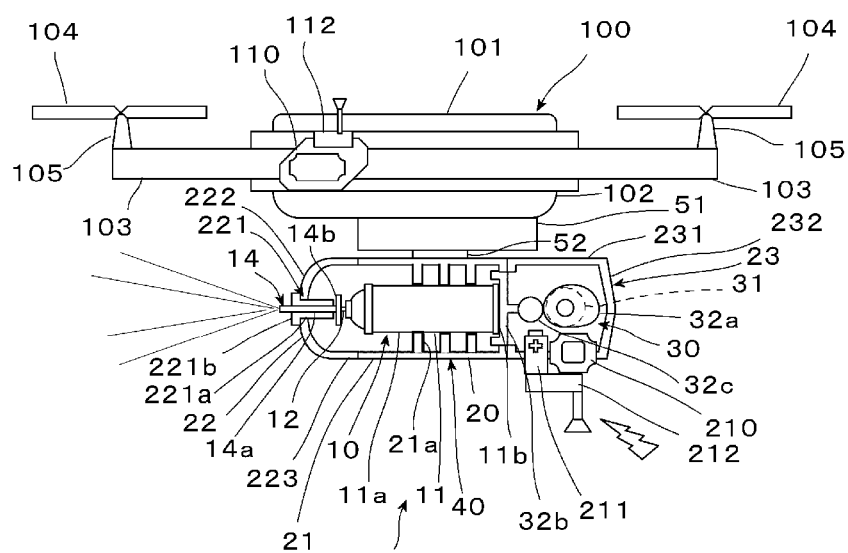

DISCHARGE DEVICE FOR AIRCRAFT

TECHNICAL FIELD

The present invention relates to a discharge device for an aircraft such as an unmanned aircraft, which discharges a liquid, a gas, air, a sound (a horn), or the like from the aircraft, and more particularly to a discharge device having an aerosol container that discharges contents thereof in response to gas pressure.

BACKGROUND ART

A bee extermination device such as that described in Patent Literature 1, for example, is known in the prior art as a discharge device for an unmanned aircraft that uses this type of aerosol container.

More specifically, a chemical agent supply unit for supplying a chemical agent into a bee's nest is provided in the interior of an airframe, and an aerosol container is attached to the chemical agent supply unit as an injection tool.

CITATION LIST

Patent Literature

Patent Literature 1: Japanese Patent Application Publication No. 2017-104063

SUMMARY OF INVENTION

Technical Problem

In the device of Patent Literature 1, however, the aerosol container is attached in the interior of the airframe, and therefore the airframe must be significantly modified in order to fit the aerosol container. Aerosol containers come in various sizes, such as diameters and heights, and therefore, when the size does not fit, further modifications are necessary. Moreover, the shape and size of the airframe are also limited by the need to install the aerosol container.

Furthermore, when exchanging the aerosol container, it is necessary to remove the aerosol container from the interior of the airframe and house a new aerosol container therein while avoiding the rotor, and therefore the exchange operation is complicated.

To solve these problems, the aerosol container may be attached to the exterior of the airframe using a clamp member, but in the event of a multicopter crash, a direct impact may be exerted on the aerosol container, causing perforation and outflow of contents.

Further, the aerosol container must be structured safely so that when the aerosol container is gripped, an aerosol container can does not fall off, and in this case, it may be necessary to perform special shaping processing on the aerosol container, select a special surface material therefor, and so on while also ensuring that the aerosol container can easily be exchanged.

The present invention has been designed to solve the problems in the prior art, described above, and an object thereof is to provide a discharge device for an aircraft, in which an aerosol container can easily be attached to an airframe and an exchange operation can be performed easily, resulting in a high degree of safety.

Solution to Problem

To achieve the object described above, a discharge device according to the present invention is a discharge device for an aircraft, to which an aerosol container can be attached and which discharges contents of the aerosol container when attached to the aircraft, wherein the discharge device is mounted on an airframe of the aircraft in a state where the aerosol container is housed inside a housing member.

According to the present invention, the aerosol container is attached to the airframe of the aircraft via the housing member, and therefore the aerosol container can be attached to the airframe of the aircraft without modifying the interior configuration of the airframe.

In other words, it is only necessary to prepare a housing member corresponding to the diameter and size of the aerosol container and not necessary to significantly modify the airframe, and therefore a high degree of convenience is achieved. Further, a mounting method suited to the shape of the airframe can be adopted, and therefore a high degree of versatility is achieved.

Furthermore, the aerosol container can easily be exchanged simply by attaching the aerosol container to the airframe together with the housing member or attaching the aerosol container to the housing member mounted on the airframe, and therefore an exchange operation is easy.

Moreover, the aerosol container is protected from impacts by the housing member, and therefore a high degree of safety is achieved.

In particular, by increasing the degree of sealing of the housing member, the degree to which a container main body is directly exposed to the external environment can be reduced, and as a result, variation in internal pressure due to temperature variation can be suppressed.

The present invention is configured as follows.

1. A discharge drive unit is provided to discharge contents from the aerosol container.

2. The discharge drive unit is configured to discharge the contents by moving a container main body of the aerosol container so that a stem projecting from the container main body is pressed into the container main body.

By moving the aerosol container while housed in the housing member, an actuator-side position can be kept constant.

3. The discharge drive unit is provided in the housing member.

By providing the discharge drive unit in the housing member, an appropriate mechanism can be selected for the size, shape, and weight of the aerosol container, and as a result, an optimum structure can be provided for the aerosol container.

4. The housing member and the airframe are provided with coupling portions that are coupled to each other.

By unifying the standard of the coupling portions, housing members for aerosol containers of different sizes and types can be exchanged.

5. The discharge drive unit is provided on the airframe side.

By providing the discharge drive unit on the airframe side, it is not necessary to provide the discharge drive unit on the housing member side, and therefore the configuration on the housing member side can be simplified, enabling a cost reduction.

6. A coupling portion by which the housing member is coupled to the discharge drive unit is provided.

By coupling the housing member to the discharge drive unit, a coupling portion for coupling the housing member to the airframe is not required.

7. A control device for controlling the discharge drive unit is further provided.

The control device may be provided separately from a control device of the aircraft or incorporated into the control device of the aircraft. When the control devices are provided separately, there is no need to modify the control device of the aircraft, and attachment can be simplified.

8. The control device is provided on the airframe side.

By providing the control device on the airframe side, the control device can be integrated when exchanging the housing member.

9. The control device is provided on the housing member side.

By providing the control device on the housing member side, there is no need to provide electrical contacts or the like on the coupling portions.

10. A communication device for operating the discharge drive unit remotely is further provided.

The communication device may likewise be provided separately from a communication device of the aircraft or integrated with the communication device of the aircraft. When the communication devices are provided separately, remote operations can be performed without modifying the communication device of the aircraft.

11. A power supply for driving the discharge drive unit is provided.

By providing a dedicated power supply, excessive wear on the power supply of the aircraft can be avoided.

12. The power supply is provided on the airframe side.

By providing the power supply on the airframe side, the power supplies can be integrated when exchanging the housing member. Moreover, the configuration on the housing member side can be simplified.

13. The power supply is provided on the housing member side.

Thus, there is no need to provide electrical contacts or the like on the coupling portions.

14. A power supply used to control flight of the aircraft is used as the power supply for driving the discharge drive unit.

Thus, the power supply configuration can be simplified.

15. The discharge drive unit includes a driving mechanism that discharges the contents by fixing either a container main body of the aerosol container or a stem that projects from the container main body and moving the other so that the other is moved in a direction for pressing in the stem relative to the container main body.

Thus, the existing aerosol container can be used while attached to the housing member.

16. The aerosol container is exchangeable relative to the housing member.

Thus, it is possible to exchange only the aerosol container, and therefore the housing member can be universalized.

17. The housing member includes a housing member main body in which the aerosol container is housed, and a lid body for opening and closing an opening portion provided in the housing member main body, and the aerosol container can be exchanged by opening the lid body in a state where the housing member main body is attached to the airframe.

Thus, the aerosol container can be exchanged easily.

18. The housing member main body is formed in a tubular shape extending in a central axis direction of the aerosol container, and the opening portion and the lid body are provided on a head portion side and/or a bottom portion side of the aerosol container.

Thus, the aerosol container can be exchanged even more easily.

19. The opening portion and the lid body are provided on the head portion side of the aerosol container, and the housing member is configured so as to open on the head portion side of the aerosol container.

20. The opening portion and the lid body are provided on the bottom portion side of the aerosol container, and the housing member is configured so as to open on the bottom portion side of the aerosol container.

21. The lid body includes the discharge drive unit and is configured so as to be detached from the housing member main body together with the discharge drive unit.

22. The lid body is configured to be screwed to the housing member main body.

23. The lid body includes fixing means that is supported to be capable of rotating relative to the housing member main body via a hinge and that couples and fixes the lid body in a closed position.

The lid body can be opened and closed easily.

24. The fixing means is a snap lock.

An operation to fix the lid body can be performed easily.

25. The lid body is engaged to the housing member main body by a plurality of fixing means.

A hinge is not necessary.

26. The aerosol container is integrated with the housing member so as to be non-exchangeable.

By integrating the aerosol container, the exchange operation can be performed easily. Further, mistakes when attaching the aerosol container can be avoided, and therefore a high degree of safety is achieved.

27. The housing member includes a support portion that holds the aerosol container by means of a structure having a distance from a wall surface of the housing member.

By employing a structure having a distance from a wall surface of the housing member, thermal insulation can be realized by air or a layer of insulating material between the aerosol container and the housing member.

Further, when the discharge device is dropped, the holding portion serves as a shock-absorbing mechanism, and therefore the impact on the aerosol container can be alleviated.

Advantageous Effects of Invention

According to the present invention, as described above, it is possible to realize a discharge device for an aircraft, in which an aerosol container can easily be attached to an airframe and an exchange operation can be performed easily, resulting in a high degree of safety.

BRIEF DESCRIPTION OF DRAWINGS

FIG. 1 is a conceptual view of a discharge device for an aircraft according to a first embodiment of the present invention, wherein FIG. 1(A) is a front view, FIG. 1(B) is a side view, and FIG. 1(C) is a view showing a state in which a housing member has been removed.

FIG. 2(A) is a sectional view taken in a right-angled direction to an axis of a support portion of a sleeve shown in FIG. 1, FIG. 2(B) is a view showing an example of a valve configuration of an aerosol container shown in FIG. 1, FIG. 2(C) is a view showing an example in which a power supply of a flight control unit is used as a power supply, and FIG. 2(D) is a view showing an example configuration of coupling portions.

FIG. 5 is a view showing an example in which an extension tube is used in the discharge device for an aircraft of FIG. 1, wherein

FIG. 6 is a view showing modified example 1 of the first embodiment of the present invention, wherein

FIG. 7 is a view showing modified example 2 of the first embodiment of the present invention, wherein

FIG. 8 is a view showing modified example 3 of the first embodiment of the present invention, wherein FIG. 8(A) is a front view showing a state in which the sleeve has been removed from the airframe and FIG. 8(B) is a front view showing a state in which the sleeve is coupled to the airframe.

FIG. 9 is a view showing modified example 4 of the first embodiment of the present invention, wherein

FIG. 10 is a view showing modified example 5 of the first embodiment of the present invention, wherein

FIG. 11 is a view showing modified example 6 of the first embodiment of the present invention, wherein

DESCRIPTION OF EMBODIMENTS

Figure 3A:
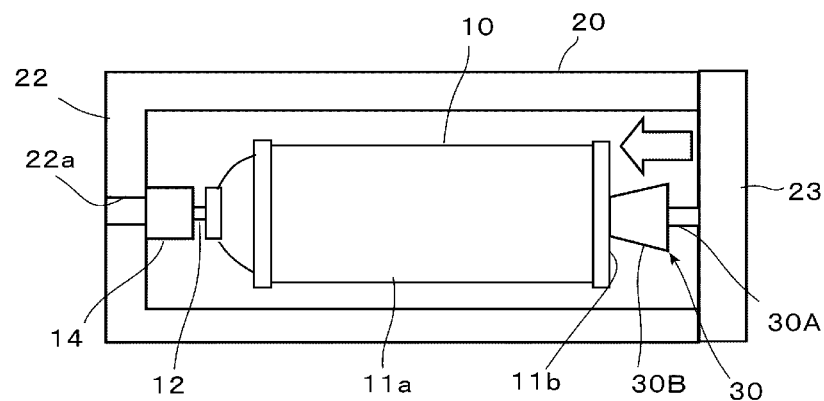
FIGS. 3(A) to 3(C) are views showing three methods employed by a discharge drive unit.

The present invention will be described in detail below on the basis of an embodiment shown in the figures.

Dimensions, materials, shapes, relative arrangements, and so on of constituent components described in the following embodiment are to be modified as appropriate in accordance with the configuration of the device to which the invention is applied and various conditions. Therefore, the scope of the invention is not limited to the embodiment described below.

FIG. 1 is a conceptual view of a discharge device for an aircraft according to an embodiment of the present invention.

In the figure, 1 denotes a discharge device for an aircraft, which includes an aerosol container 10 and discharges contents of the aerosol container 10 when attached to an aircraft 100. As regards the discharged contents, not only a liquid but also a gas, a gas such as air, a powder, or the like may be discharged, and cases in which a sound (a horn) or the like is discharged are also included. Sound discharge is configured so that the sound is emitted when a gas is ejected, for example.

The discharge device 1 for an aircraft is mounted on the exterior of an airframe 101 of the aircraft 100 in a state where the aerosol container 10 is housed in a sleeve 20 serving as a housing member. A discharge drive unit 30 for discharging the contents from the aerosol container 10 is built into the sleeve 20. The sleeve 20 and the aerosol container 10 can be exchanged integrally, and in the following description, an assembly in which the aerosol container 10 is housed in the sleeve 20 will be referred to as an aerosol container assembly 40.

The aircraft 100 is an unmanned aircraft such as a so-called multicopter, the airframe 101 includes a main body portion 102 and a plurality of arm portions 103 extending radially from the main body portion 102, and a rotary blade 104 is provided on the tip end of each arm portion 103 via a motor 105. In the example in the figures, the rotary blades 104 are shown in two locations on the left and right sides, but as long as the rotary blade 104 is provided in a plurality, various well-known multicopters having three rotary blades (a tricopter), four rotary blades (a quadcopter), six rotary blades (a hexacopter), and so on may be applied.

[Aerosol Container]

The aerosol container 10 is a container from which contents are ejected in response to gas pressure from liquefied gas or compressed gas charged in the interior thereof, and an existing metal aerosol can may be applied thereto. A pressure-resistant plastic container may also be used. In the aerosol container 10, various actuators with a flow passage formed therein are attached to a stem 12 in accordance with the discharge direction and discharge form. In the example in the figures, an actuator 14 oriented in a central axis direction is attached to the stem of the aerosol container 10. A nozzle with an orifice formed therein may be attached to the tip end of the actuator 14, and whether to discharge the contents in mist form or in the form of a linear jet is selected as appropriate in accordance with the discharge form and discharge direction of the contents.

The aerosol container 10 is used horizontally, and therefore, as the form in which a propellant and the contents are sealed therein, a segregated form in which an undiluted solution is housed in an inner bag and the propellant is housed between the outer periphery of the inner bag and the inner periphery of the container main body is used. With the segregated form, the contents can be discharged even when the attitude of the aerosol container is in a lateral orientation (the stem is positioned on the side) or a downward orientation (the stem is positioned at the bottom).

The form of the propellant and the contents is not limited to the segregated form. When the aerosol container 10 is used in an attitude where the stem is oriented upward during discharge, a two-phase or three-phase container having a dip tube may be applied, and when the aerosol container 10 is used in an attitude where the stem is oriented downward, a two-phase or three-phase container not having a dip tube may be applied.

Note that as the propellant, a liquefied gas such as a typical hydrocarbon (liquefied petroleum gas) (LPG), dimethyl ether (DME), or a fluorinated hydrocarbon (HFO-1234ze), or a compressed gas such as carbon dioxide ($CO_2$), nitrogen ($N_2$), or nitrous oxide ($N_2O$) may be applied, but in consideration of fire safety, a non-flammable fluorinated hydrocarbon, carbon dioxide, nitrogen, nitrous oxide or the like is preferable, while nitrogen is particularly preferable in consideration of the environmental load.

[Configuration of Sleeve 20]

As regards the material of the sleeve 20, the sleeve 20 is formed from a strong but lightweight material, for example a metal such as aluminum, plastic, or carbon fiber. Further, the material is not limited to a hard material, and a soft material, for example a rubber material such as silicone rubber or urethane rubber, may also be used. In short, any of various materials capable of holding the shape of the housing portion housing the aerosol container 10 can be used. The term "sleeve" is used to mean a tubular member in which the cylindrical aerosol container 10 is housed.

The sleeve 20 is constituted by a cylindrical sleeve main body 21 having a larger diameter than the aerosol container 10, a first end portion cover portion 22 covering one end portion of the sleeve main body 21, and a second end portion cover portion 23 provided on the other end portion.

The first end portion cover portion 22 is screwed to the sleeve main body 21 via a screw portion so as to be detachably fixed thereto, while the second end portion cover portion 23 is fixed to the sleeve main body 21 non-detachably. Alternatively, the second end portion cover portion 23 and the sleeve main body 21 may be formed integrally.

The first end portion cover portion 22 is configured to include a dome-shaped cover main body 222 and a screw tube portion 223 that is screwed to a female screw portion of the sleeve main body 21. In consideration of the aerodynamic characteristic, the cover main body 222 has a conical or dome-shaped curved surface that gradually decreases in diameter toward the tip end and is rounded at the tip end. By forming the cover main body 222 in a shape exhibiting a favorable aerodynamic characteristic in this manner, the effect of horizontal direction wind (crosswinds) can be reduced, and as a result, flight can be stabilized.

A discharge drive unit 30 is housed in the second end portion cover portion 23 positioned on a bottom portion side of the aerosol container 10, and the second end portion cover portion 23 functions as a casing of the discharge drive unit 30. The second end portion cover portion 23 is configured to include a tubular portion 231 fixed at one end to a rear end portion of the sleeve main body 21 (the end portion on the bottom portion side of the aerosol container 10), and an end plate 232 that closes the other end of the tubular portion 231.

[Support Configurations for Aerosol Container 10 Housed in Sleeve 20]

Radial Direction Support

To support the aerosol container 10, the sleeve 20 is provided with a support portion 21a that holds the aerosol container 10 by means of a structure having a distance from the wall surface of the sleeve 20. The support portion 21a is provided in a plurality of locations (three locations in the example in the figures) in an axial direction, and in the example in the figures, the support portions 21a hold a trunk portion 11a of the aerosol container 10 so as to prevent movement thereof in an orthogonal direction to a central axis while allowing movement in the axial direction. As regards the support structure provided by the support portions 21a, the support portions 21a may partially contact the trunk portion 11a of the aerosol container 10 in a plurality of circumferential direction locations, as shown in FIG. 2(A), or the support portions 21a may support the entire circumference by forming an annular wall. As a method for holding the aerosol container 10 in a separated state, instead of supporting the trunk portion 11a in the above manner, the trunk portion 11a may be set in a separated state by supporting the two end portions, for example the shoulder portion and the bottom portion, of the aerosol container 10.

The aerosol container 10 may also be supported in a state where the trunk portion 11a thereof contacts the inner wall of the sleeve 20 rather than being separated therefrom, but by separating the trunk portion 11a of the aerosol container 10 from the inner wall of the sleeve 20, an insulating material or a heat storage material can be interposed in the space formed by the separation.

Note that the sleeve 20 does not have to have a sealed structure and may have a partially ventilated structure. For example, a structure formed by mesh, punching, or the like may be applied. In so doing, effects such as facilitating self-cooling during aerosol discharge by means of outside air and reducing the weight of the sleeve 20 can be achieved.

Axial Direction Support

As regards axial direction support of the aerosol container 10, meanwhile, a bottom portion 11b contacts a movable plate 32b forming a part of the discharge drive unit 30 disposed on the second end portion cover portion 23 side, while a head portion side of the aerosol container 10 is held in the axial direction by bringing a flange portion 14b of the actuator 14 attached to the stem 12 into contact with a pressing member 221 provided on the first end portion cover portion 22.

The pressing member 221 includes a tubular body 221a that projects from an apex portion of the first end portion cover portion 22 toward the stem 12 in the central axis direction of the aerosol container 10, and an end portion flange portion 221b provided on one end of the tubular body 221a and fixed to the first end portion cover portion 22. An axial direction through hole is formed in the tubular body 221a of the pressing member 221. Meanwhile, an actuator main body portion 14a of the actuator 14 penetrates the pressing member 221 slidably, and a tip end surface of the tubular body 221a either contacts or is close to the flange portion 14b, which protrudes from the actuator main body portion 14a. The pressing member 221 may be formed integrally with the second end portion cover portion 23.

[Configuration of Discharge Drive Unit 30]

In the example in the figures, the discharge drive unit 30 housed in the second end portion cover portion 23 is constituted by a cam 32a that is driven to rotate by a motor 31, and the driven-side movable plate 32b, which is moved in a linear direction by the rotation of the cam 32a. The movable plate 32b is provided with a cam follower 32c that contacts the cam 32a, and a rotary motion of the cam 32a is converted into a linear motion of the movable plate 32b via the cam follower 32c. The movable plate 32b is normally in a retraction limit position, whereby a valve 13 is held in a closed position. When the cam 32a is rotated by the motor 31, the movable plate 32b advances. More specifically, a contact region in which the cam follower 32c contacts the cam 32a in the retraction limit position is set so that the distance from the rotary center is short, and a contact region in which the cam follower 32c contacts the cam 32a in an advancement limit position is set so that the distance from the rotary center is long. In the example in the figures, the shape of the cam 32a is exaggerated.

[Configuration of Valve]

FIG. 2(B) shows an example of the valve of the aerosol container 10.

The stem 12 is provided with a discharge flow passage 12a that extends by a predetermined dimension in the axial direction from a tip end opening portion, and a stem hole 12b that serves as a valve hole is opened in a side face of the stem 12. The stem hole 12b is sealed by an inner peripheral surface of a gasket 13a attached to a hole edge of a through hole in a mounting cap 11d.

Normally, the stem 12 is biased in a projecting direction by the gas pressure and the biasing pressure of a spring 13b, and by pushing an inner peripheral edge of the gasket 13a, which serves as a valve body, in the axial direction, the inner peripheral surface of the gasket 13a comes into close contact with a hole edge of the stem hole 12b, which constitutes a valve seat, whereby the valve is maintained in a closed state.

When the movable plate 32b is moved to the advancement limit by the cam mechanism 32 of the discharge drive unit 30 described above, the aerosol container 10 moves to the first end portion cover portion 22 side such that the flange portion 14b of the flanged actuator 14 comes into contact with an end surface of the pressing member 221, and as a result, the stem 12 is pressed relatively toward the inside of the container by a reaction force thereto. When the stem 12 is pressed, an inner peripheral edge of the gasket 13a bends toward the inside of the container such that the inner peripheral surface of the gasket 13a separates from the hole edge of the stem hole 12b, thereby opening the valve, and as a result, the contents pressed by the gas pressure are discharged through the discharge flow passage 12a in the stem 12.

The valve configuration shown in the figures is merely an example, and various configurations that are opened and closed by operating the stem 12 may be applied as the valve configuration.

In this example, the rotary motion of the motor 31 is converted into a linear motion by a cam mechanism, but this motion conversion is not limited to a cam mechanism, and any mechanism for converting the rotary motion of the motor 31 into a linear motion, such as a screw feed mechanism or a rack and pinion, for example, may be applied. Further, as the drive source, a linear motor for performing linear driving, an electromagnetic solenoid, or the like may be used instead of a rotary motor.

Figure 15A:
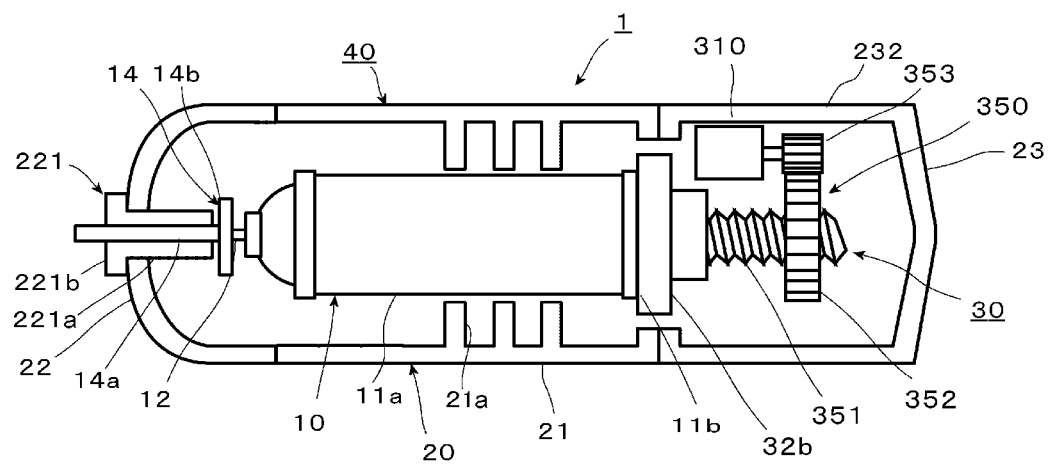
FIG. 15(A) is a view showing another example configuration of the discharge drive unit.

FIG. 15(A) shows an example in which a screw feed mechanism is used in the discharge drive unit 30.

A screw feed mechanism 350 includes a screw shaft 351 fixed to the movable plate 32b, and a rotating member 352 meshed to the screw shaft 351. The screw shaft 351 extends along an extension line of the central axis of the aerosol container 10 and is fixed at one end to the movable plate 32b. The rotating member 352 is fixed in the axial direction and movable in a rotary direction, while a screw (not shown) to which the screw of the screw shaft 351 is meshed is provided on an inner periphery thereof and teeth forming an external gear are provided on an outer periphery thereof.

A rotary motor 310 is arranged so that a motor shaft 311 is parallel with the screw shaft 351, and a gear 353 that meshes with the external gear on the outer periphery of the rotating member 352 is fixed to the motor shaft 311.

When the rotating member 352 is driven by the rotary motor 310, the screw shaft 351, which is held so as to be incapable of moving in the rotary direction, moves in the axial direction, thereby moving the aerosol container 10 toward the head portion side via the movable plate 32b, and as a result, the stem 12 is pressed into the container, thereby opening the valve such that discharge can be performed. Further, when the rotating member 352 is rotated in reverse, the aerosol container 10 is moved toward the bottom portion side, whereby the pressing applied to the stem 12 is released, and as a result, the valve can be closed.

Figure 15B:
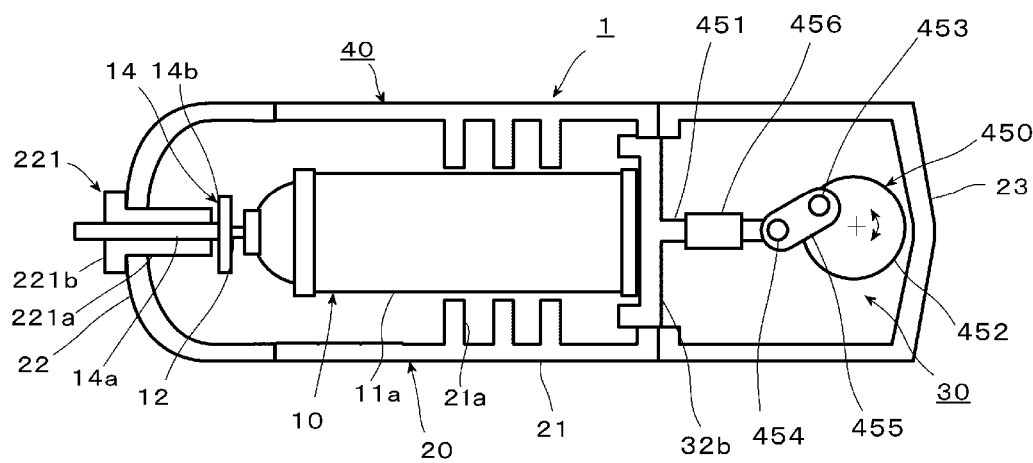
FIG. 15(B) is a view showing a further example configuration of the discharge drive unit.

FIG. 15(B) shows an example in which a link mechanism is used in the discharge drive unit 30.

A link mechanism 450 includes a slide shaft 451 fixed to the movable plate 32b, a rotating member 452 that rotates about a rotary axis that is orthogonal to the slide shaft 451, an eccentric pin 453 provided on the rotating member 452, and a link 455 that couples the eccentric pin 453 to a coupling pin 454 provided on an end portion of the slide shaft 451. The slide shaft 451 is guided in a linear direction via a linear bearing 456, and the rotating member 452 is driven to rotate by a motor, not shown in the figure.

When the rotating member 452 is driven by the rotary motor, not shown in the figure, the link 455 coupled to the eccentric pin 453 is rotationally displaced about the coupling pin 454 by the rotation of the rotating member 452 such that the slide shaft 451 moves in the axial direction via the link 455. Accordingly, the aerosol container 10 is moved toward the head portion side via the movable plate 32b such that the stem 12 is pressed into the container, and as a result, the valve is opened and discharge can be performed. Further, when the rotating member 352 is rotated in reverse, the aerosol container 10 is moved toward the bottom portion side, whereby the pressing applied to the stem 12 is released, and as a result, the valve can be closed.

[Three Methods Used by Discharge Drive Unit]

The discharge drive unit 30 shown in FIG. 1 is an example, and any of three methods shown in FIG. 3 can be applied as the configuration of the discharge drive unit 30. In FIG. 3, the sleeve 20 is shown in a simplified square shape.

FIG. 3(A) shows a configuration in which the actuator 14 side of the aerosol container 10 is fixed to the sleeve 20, and a contact member 30B that contacts the bottom portion 11b of the aerosol container 10 is pushed up by a drive unit 30A. The discharge drive unit 30 of FIG. 1 is an example of this method. In this method, the actuator 14 side is fixed, and therefore the precision of the discharge position is high. Moreover, this method can be used with aerosol containers 10 of various diameters.

Figure 3B:
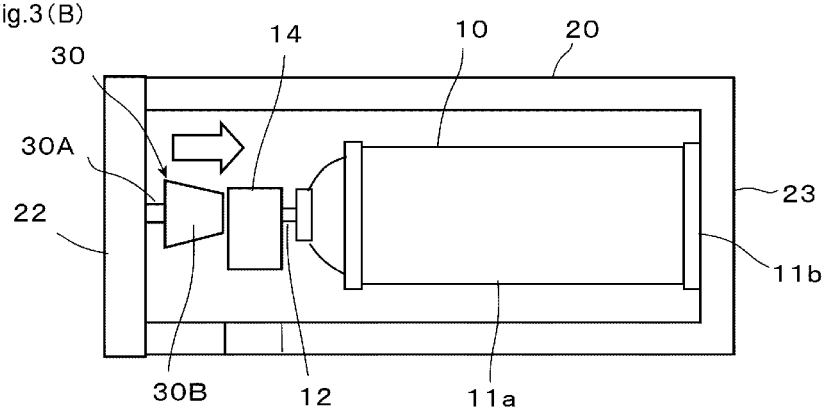

FIG. 3(B) shows a configuration in which the aerosol container 10 is fixed to the sleeve 20 and the actuator 14 is pushed down by the discharge drive unit 30. More specifically, the drive unit 30A of the discharge drive unit 30 drives the contact member 30B contacting the actuator 14 in a direction for pushing the contact member 30B down.

According to this method, the mechanical mechanism can be concentrated on one side of the aerosol container 10, making the aerosol container 10 compact and easy to exchange. Moreover, this method can be used with aerosol containers 10 of various heights.

Note that any mechanism that performs driving in a linear direction may be used as the drive unit 30A in FIGS. 3(A) and 3(B), and accordingly, a motion conversion mechanism such as a cam or a screw feed mechanism that converts the rotary motion of a rotary motor into a linear motion can be used. Moreover, instead of a rotary motor, a linear motor for performing linear driving, an electromagnetic solenoid, or the like may be used.

Figure 3C:
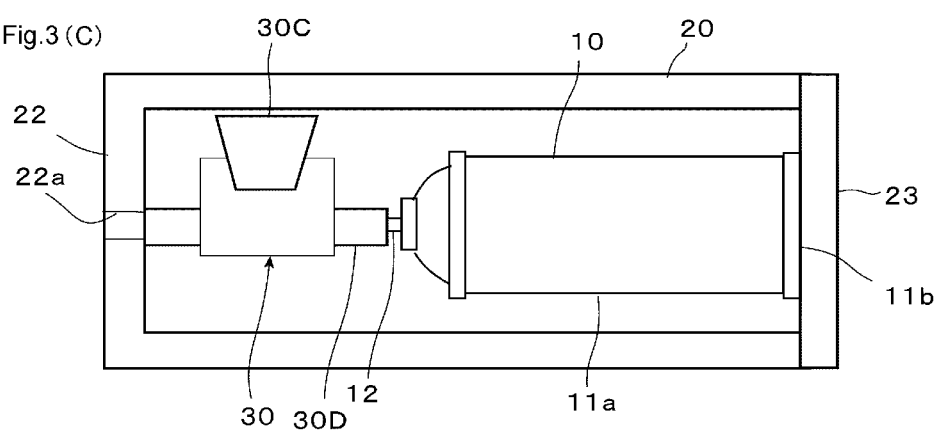
Figure 4:
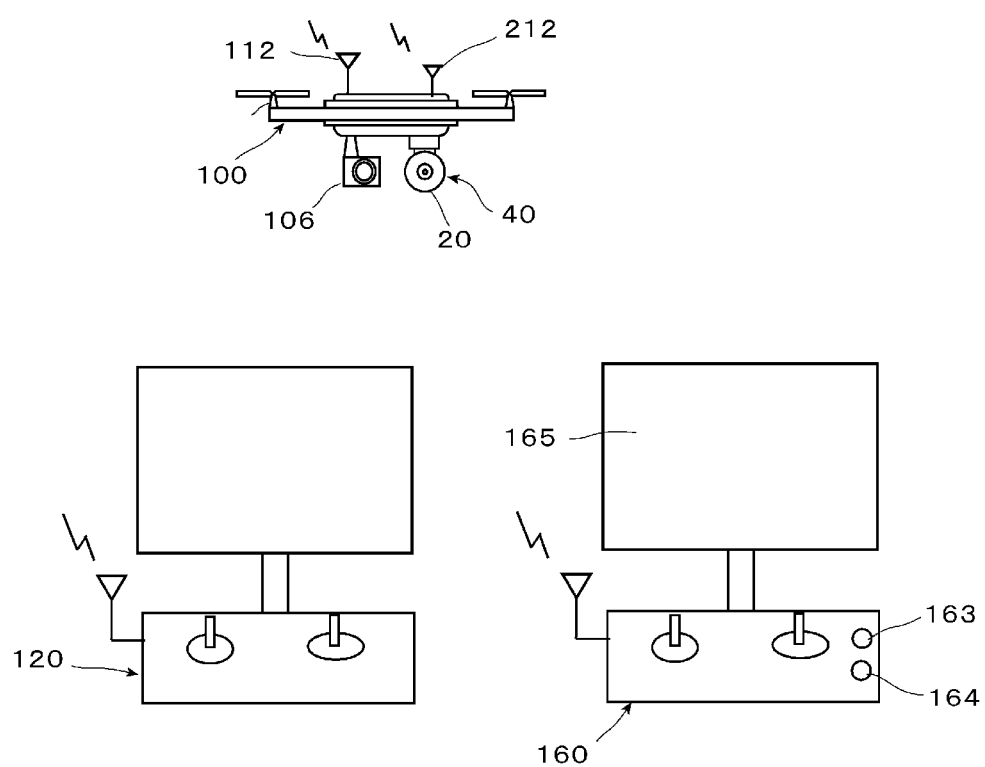
FIG. 4 is a view showing an example of a steering terminal and a discharge operation terminal.
Figure 5A:
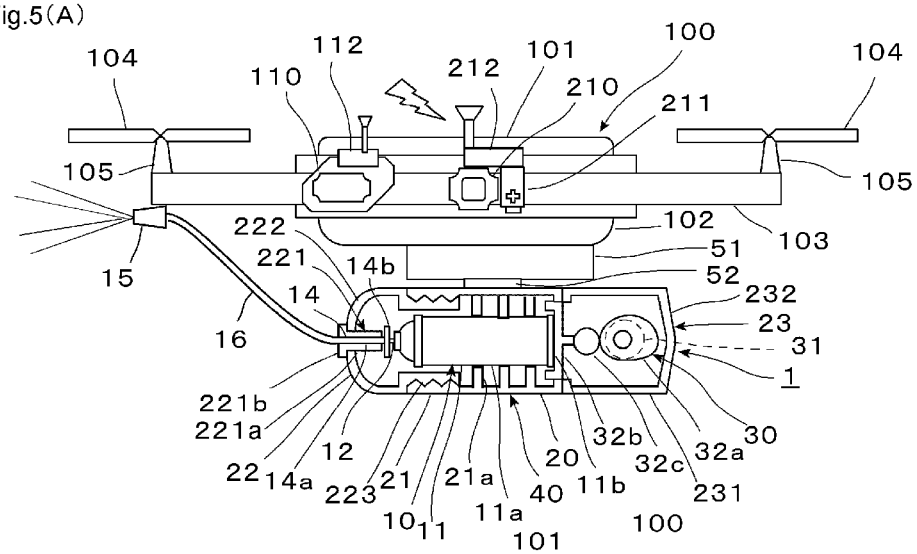
FIG. 5(A) is a front view and FIG. 5(B) is an exploded front view showing a state in which the housing member has been removed.
Figure 5B:
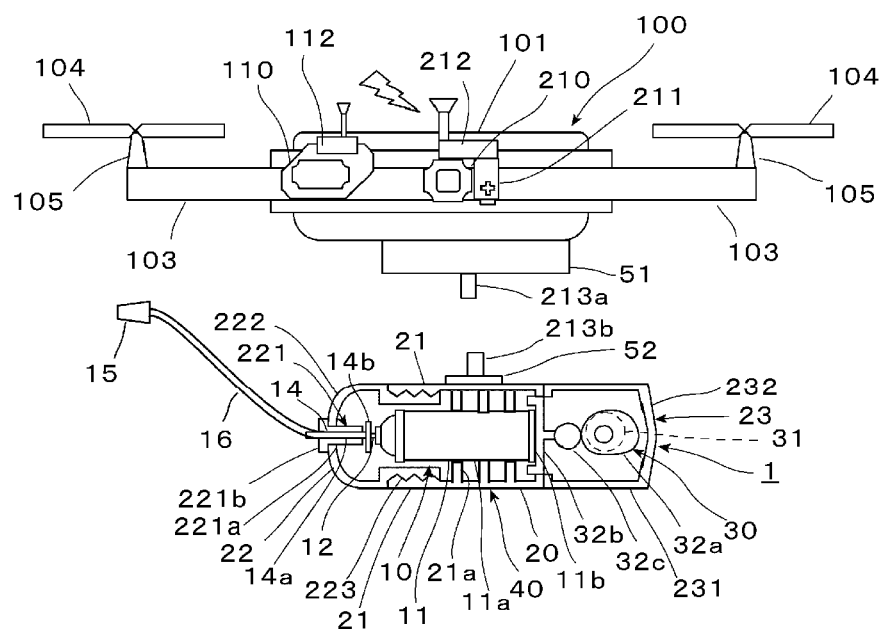

FIG. 3(C) shows a configuration in which control is performed by an external valve 30C instead of a valve provided in the interior of the aerosol container 10. In the figure, the external valve 30C is illustrated conceptually, but the external valve 30C can be configured so as to be driven to open and close by a solenoid valve or the like. When the external valve 30C is used, the stem 12 of the aerosol container 10 is simply connected to a pipe passage 30D, and therefore the aerosol container 10 can be attached easily and opening/closing control is also easy. When the existing aerosol container 10 is used, the stem 12 is pushed in while incorporating the aerosol container 10, for example, so that the internal valve is held in a normally open state.

[Electrical Equipment]

A discharge control unit 210 serving as a control device for controlling the discharge drive unit 30 is provided separately to a flight control unit 110 for controlling flight of the aircraft 100 and provided on the airframe 101 side together with the flight control unit 110. Further, a discharge power supply 211 for driving the discharge drive unit 30 is provided separately to a power supply for driving the aircraft 100 (this power supply is incorporated into the flight control unit 110 and not shown in the figures) and mounted on the airframe 101 side.

Furthermore, a discharge communication unit 212 including an antenna for remotely operating the discharge drive unit 30 is provided separately to a flight communication unit 112 including an antenna for remotely operating the aircraft 100 and mounted on the airframe 101.

The functions of the discharge control unit 210, the discharge communication unit 212, and the discharge power supply 211 for the discharge drive unit 30 may be executed partially or entirely by the flight control unit 110, the flight communication unit 112 and a flight power supply. FIG. 2(C) shows an example in which a shared power supply is disposed in the flight control unit 110.

[Coupling Structure for Coupling to Airframe]

Coupling portions 51, 52 that can be coupled to each other detachably are provided respectively on the airframe 101 of the aircraft 100 and the sleeve 20 of the aerosol container assembly 40. The coupling portions 51, 52 in FIG. 1 are illustrated conceptually, but as shown in FIG. 2(D), for example, by disposing a drive unit slide rail 51b having a T-shaped groove 51a as the coupling portion 51 on the aircraft 100 side and providing a housing member-side coupling portion 52 having a T-shaped fitting convex portion 52a that is fitted to the T-shaped groove 51a of the slide rail 51b on the outer periphery of the sleeve 20 of the aerosol container assembly 40, the coupling portions 51, 52 can be attached and detached easily. Needless to mention, the coupling portions 51, 52 are not limited to a sliding type fitting structure, and a configuration with which the coupling portions 51, 52 can be attached and detached in a rotation direction, such as a bayonet coupling, as well as various other coupling means facilitating attachment and detachment, such as screwing, a clip joint, or a clamp, may be applied.

Further, as shown in FIG. 1(C), the airframe-side coupling portion 51 and the housing member-side coupling portion 52 are respectively provided with electrical contacts 213a, 213b for electrically connecting the discharge control unit 210 and discharge power supply 211 disposed on the airframe 101 side to the motor of the discharge drive unit 30 and so on.

The electrical contacts 213a, 213b do not have to pass through the coupling portions 51, 52 and may be directly connected from the sleeve 20 to a connector disposed in the airframe 101 by a cable or the like, for example. Alternatively, a power supply such as a secondary battery and a wireless communication device may be provided in the sleeve 20, and electrical signals from the flight control unit 110 disposed on the airframe 101 side may be exchanged with the flight control unit 110 in the sleeve 20 by wireless communication.

Next, actions of the discharge device for an aircraft according to the present invention will be described.

[Exchange Operation]

The aerosol container assembly 40, in which the aerosol container 10 is housed in the sleeve 20, is prepared in advance. In an exchange operation, the coupling portions 51, 52 are detached and the new aerosol container assembly 40 is attached. By forming the coupling portions 51, 52 to be easily attachable and detachable by means of a manual operation without the use of a tool, for example, exchange can be performed easily. Following the exchange, the aerosol container 10 is removed from the sleeve 20 of the aerosol container assembly 40, and after completely discharging the gas and contents therein, the aerosol container 10 is discarded. The sleeve 20 can be used repeatedly. Further, by universalizing the coupling portions 51, 52 that are coupled to the aircraft 100, aerosol container assemblies 40 of different sizes can be used, while the airframe 101 side of the aircraft 100 need only be subjected to minimal modification in order to provide the coupling portion 51.

Furthermore, in this embodiment, it is possible to exchange only the aerosol container 10 while keeping the sleeve 20 fixed to the aircraft 100.

Figure 16A:
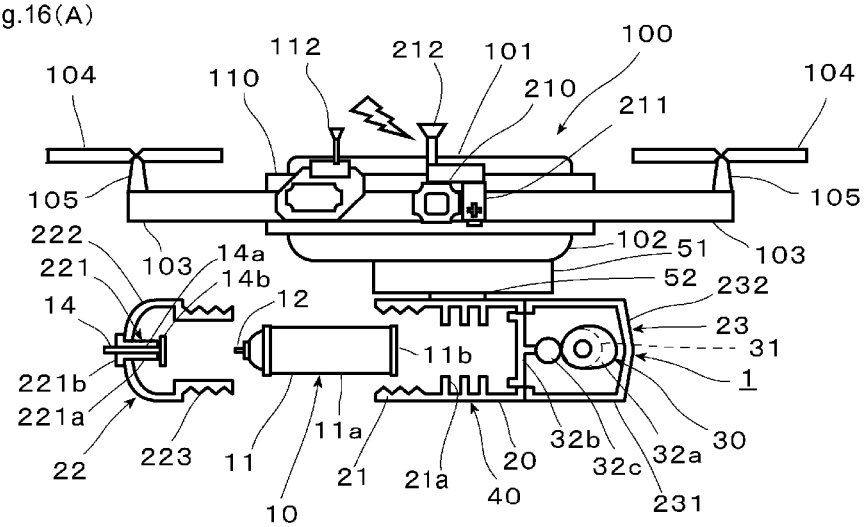
FIG. 16(A) is an illustrative view showing a state in which the aerosol container is exchanged from a head portion side.

More specifically, as shown in FIG. 16(A), by rotating the first end portion cover portion 22 and unscrewing the screw tube portion 223, the aerosol container 10 can be removed and exchanged.

Figure 16B:
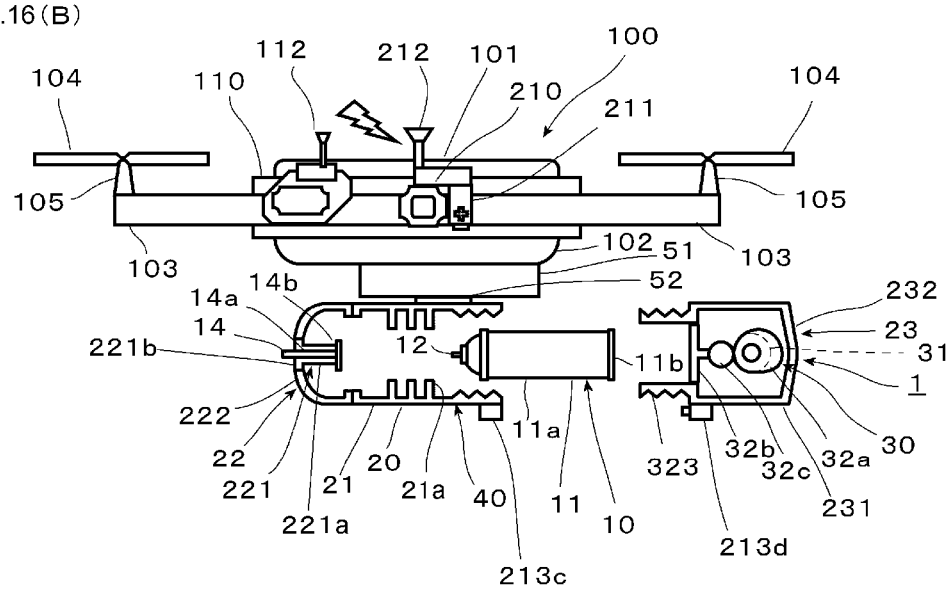
FIG. 16(B) is an illustrative view showing a state in which the aerosol container is exchanged from a bottom portion side.

Further, as shown in FIG. 16(B), the second end portion cover portion 23 may be provided with a screw tube portion 223a and fixed detachably to the sleeve main body 21 via a screw portion. In this case, the first end portion cover portion 22 may be fixed non-detachably to the sleeve main body 21. Alternatively, the first end portion cover portion 22 and the sleeve main body 21 may be formed integrally. Furthermore, in order to form an electrical connection with the discharge drive unit 30, the sleeve main body 21 may be provided with an electrical contact 213c and the second end portion cover portion may be provided with an electrical contact 213d. Thus, the second end portion cover portion 23 and the discharge drive unit 30 housed therein can be separated from the sleeve main body 21, thereby facilitating exchange of the aerosol container 10.

In this embodiment, a screw provided on the first end portion cover portion 22 or the second end portion cover portion 23 is used to open and close the sleeve main body 21, but the sleeve main body 21 may be opened and closed using a method other than screwing. For example, a combination of a hinge and a snap lock may be used.

Figure 17A:
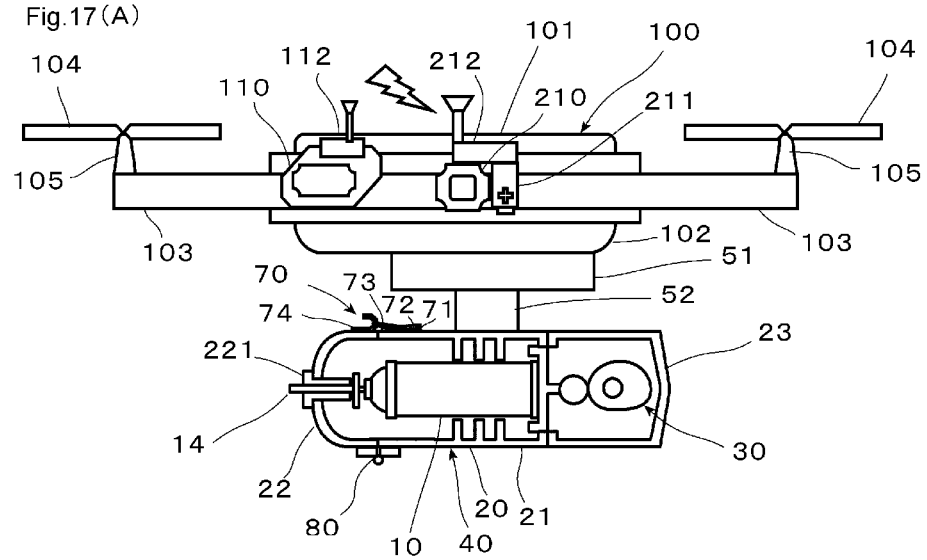
FIGS. 17(A) and 17(B) are illustrative views showing example configurations for opening and closing a first end portion cover portion using a hinge and a snap lock.
Figure 17B:
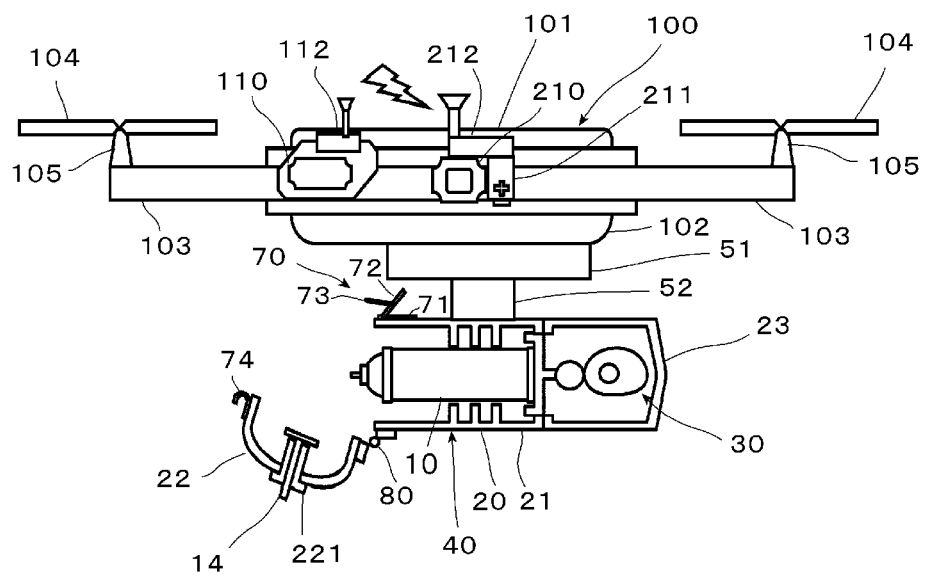
Figure 18A:
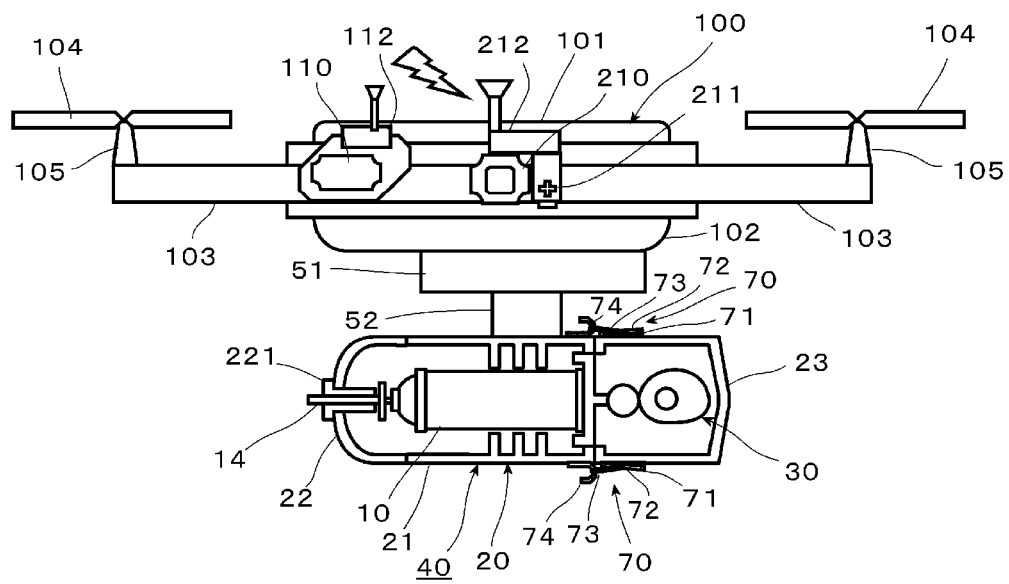
FIGS. 18(A) and 18(B) are illustrative views showing example configurations for opening and closing a second end portion cover portion using only a snap lock.
Figure 18B:
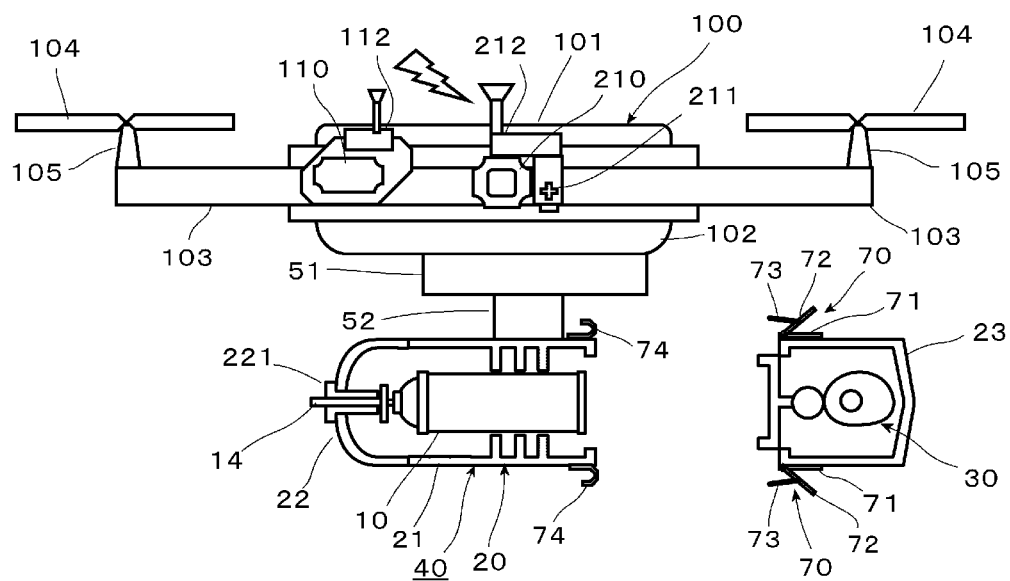
Figure 19:
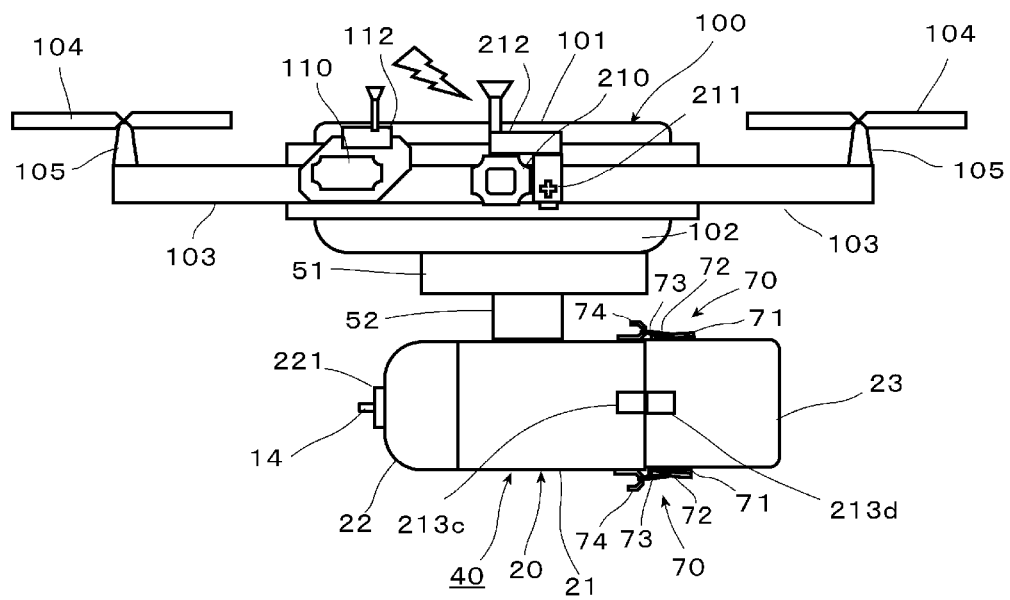
FIGS. 19(A) and 19(B) are illustrative views showing example configurations in which electrical contacts are provided in the configurations of FIG. 18.
Figure 19:
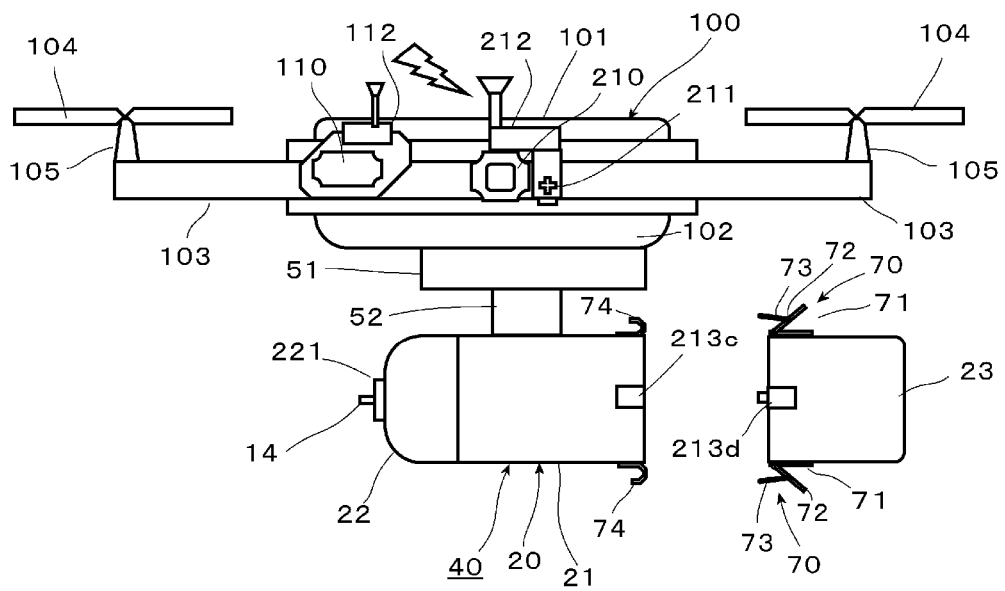

FIGS. 17(A) and 17(B) show an example configuration in which the first end portion cover portion 22 is coupled to the sleeve main body 21 by a hinge 80 so as to be openable and closeable. In a closed position, the first end portion cover portion 22 is coupled and fixed by a snap lock 70.

Various well-known configurations can be employed as the snap lock 70, but in the example in the figures, the snap lock 70 includes a lock main body 71 fixed to the sleeve main body 21, a lever 72 attached to the lock main body 71 to be free to rotate, a snap ring 73 attached rotatably to a midway position on the lever 72, and a hook member 74 fixed to the first end portion cover portion 22.

During coupling and fixing, the snap ring 73 is hooked onto the hook member 74 by raising the lever 72 in a state where the first end portion cover portion 22 is closed, and by lowering the lever 72, the snap ring 73 hooked onto the hook member 74 is pulled by the lever action such that the first end portion cover portion 22 is firmly fixed by the tension acting on the snap ring 73. When opening the first end portion cover portion 22 using the lever 72 as a fulcrum, the snap ring 73 can be unhooked from the hook member 74 by pulling up the lever 72.

As regards the snap lock 70, the lock main body 71 may be fixed to the first end portion cover portion 22 and the hook member 74 may be fixed to the sleeve main body 21.

Further, FIGS. 18(A) and 18(B) show a case in which the second end portion cover portion 23 is joined by a plurality of snap locks 70 alone rather than being coupled by a hinge.

In the example in the figures, the snap locks 70 are provided in two locations on 180° opposite sides. Likewise in this case, the second end portion cover portion 23 can be coupled to the sleeve main body 21 so as to be freely openable and closeable. When opening the second end portion cover portion 23, the levers 72, 72 of the two snap locks 70, 70 can either be raised simultaneously or detached one at a time. In so doing, the second end portion cover portion 23 can be disconnected from the sleeve main body 21.

Likewise in this case, as shown in FIGS. 19(A) and 19(B), in order to form an electrical connection with the discharge drive unit 30, the sleeve main body 21 may be provided with the electrical contact 213*c* and the second end portion cover portion 23 may be provided with the electrical contact 213*d*. In the example in the figures, the electrical contacts 213*c*, 213*d* are disposed between the two snap locks 70 in positions 90° away from the snap locks 70. Thus, the second end portion cover portion 23 and the discharge drive unit 30 housed therein can be separated from the sleeve main body 21, thereby facilitating exchange of the aerosol container 10.

[Spraying Operation]

As shown in FIG. 4, for example, during a spraying operation, the flight of the aircraft 100 is remotely operated using a steering terminal 120 and the discharge device 1 is remotely operated using a discharge operation terminal 160. The discharge operation terminal 160 is provided with a discharge button 163 and a stop button 164, and when an operator presses the discharge button 163 while viewing an image on a display 165, a discharge command signal is transmitted and received in the discharge communication unit 212 installed in the aircraft 100. The discharge drive unit 30 is then driven by the discharge control unit 210, whereby the stem 12 of the aerosol container 10 is pressed in, and as a result, the contents are discharged. When the stop button 164 is pressed, a stop command signal is transmitted, causing the discharge drive unit 30 to release the pressing applied to the stem 12, and as a result, the discharge is stopped.

Switching between discharge and stopping can be performed not only by operating the buttons but also automatically in accordance with a program stored in advance. For example, a route can be pre-programmed, the position on a map and the height can be detected using a signal from a GPS and an altimeter, respectively, discharge can be started when a predetermined position is reached, and discharge can be stopped when discharge over a predetermined area is complete.

[Example in which Extension Tube is Provided]

FIG. 5 shows an example configuration in which a nozzle 15 of the aerosol container is connected via an extension tube 16.

In this example, the aerosol container assembly 40 is mounted on the lower surface of the airframe 101, the nozzle 15 is attached to a tip end position of an arm portion of the airframe 101, and the nozzle 15 is connected to the aerosol container 10 in the aerosol container assembly 40 via the flexible extension tube 16.

Thus, the nozzle 15 can be disposed in a position away from the mounting position of the aerosol container assembly 40, whereby the discharge position can be set freely and the layout freedom can be improved. For example, by attaching the nozzle 15 to a gimbal, it becomes easy to manipulate the discharge direction remotely.

As shown in FIG. 5(B), the nozzle 15, the extension tube 16, and the aerosol container 10 are formed to be disposable as an integrated unit.

The discharge device for an aircraft according to the present invention is particularly effective in pesticide spraying.

A conventional unmanned aircraft for spraying pesticides or the like has a tank, and therefore a person must transfer the pesticides to the tank. Not only is the transfer operation laborious, but it is also necessary to clean a pipe system, and moreover, the work of transferring harmful chemicals is dangerous to the body of the user. Hence, a conventional unmanned aircraft is not suitable for use by the elderly or the like.

When the aerosol container assembly 40 of the present invention is used, the aerosol container assembly 40 can easily be attached to and detached from the airframe 101, which is preferable in terms of safety. Moreover, by exchanging the extension tube 16 integrally with the aerosol container 10, the discharge device can be used without the need to consider cleaning and maintaining a pipe system.

MODIFIED EXAMPLES

Next, various modified example of the discharge device for an aircraft according to the first embodiment will be described. In the following description, mainly only points that differ from the above embodiment will be described. Identical constituent parts have been allocated identical reference symbols, and description thereof has been omitted.

The modified examples differ in terms of configuration from the following four viewpoints.

Viewpoint 1: the coupling portions between the sleeve 20 and the airframe 101.

Viewpoint 2: the position of the discharge drive unit 30.

Viewpoint 3: exchange of the aerosol container 10.

Viewpoint 4: the positions of the discharge control unit 210, the discharge communication unit 212, and the discharge power supply 211 (referred to as a whole as the electrical equipment).

In the embodiment described above, the sleeve 20 is coupled detachably to the airframe 101 (viewpoint 1), the discharge drive unit 30 is on the sleeve 20 side (viewpoint 2), the aerosol container 10 is exchangeable relative to the sleeve 20 (viewpoint 3), and the electrical equipment is on the airframe 101 side (viewpoint 4).

Note that the term "exchangeable" in viewpoint 3 expresses a state of being exchangeable using a method presented to the user by the manufacturer, while "non-exchangeable" expresses a state in which the manufacturer has not presented an exchange method to the user.

Respective modified examples will be described below from these four viewpoints.

Modified Example 1

Figure 6A:
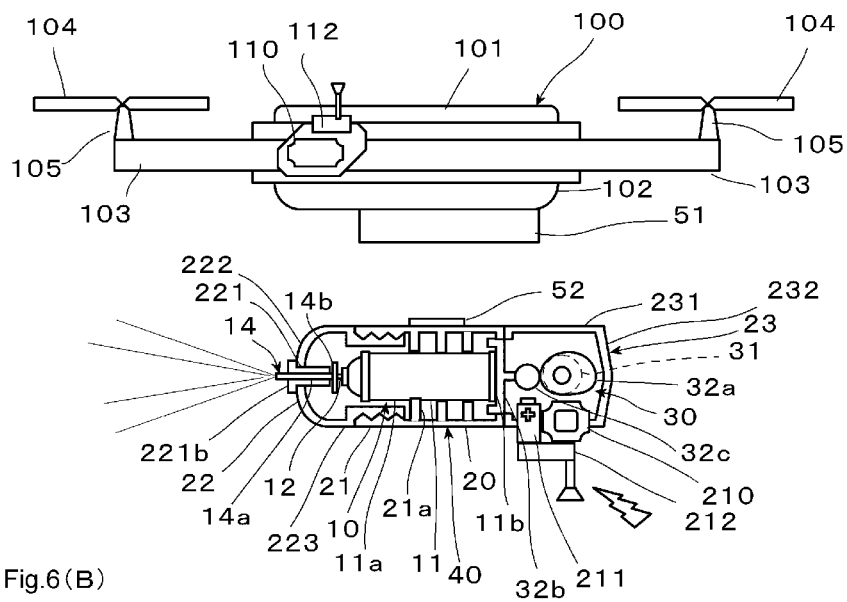
FIG. 6(A) is a front view showing a state in which the sleeve has been removed from an airframe and FIG. 6(B) is a front view showing a state in which the sleeve is coupled to the airframe.
Figure 6B:
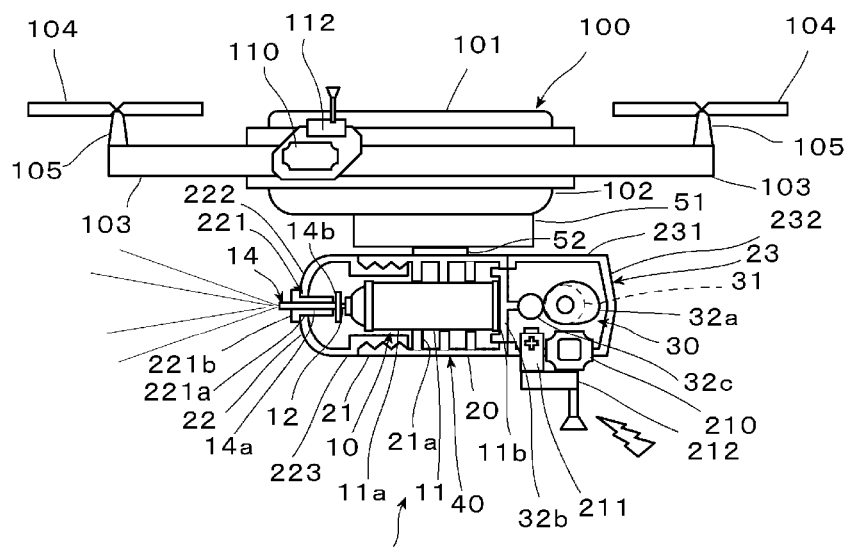

FIG. 6 shows modified example 1.

Modified example 1 is identical to the first embodiment in that the sleeve 20 is coupled detachably to the airframe 101 (viewpoint 1), the discharge drive unit 30 is on the sleeve 20 side (viewpoint 2), and the aerosol container 10 is exchangeable relative to the sleeve 20 (viewpoint 3).

Modified example 1 differs from the first embodiment in that the electrical equipment is positioned on the sleeve 20 side (viewpoint 4).

More specifically, the discharge control unit 210, the discharge communication unit 212, and the discharge power supply 211 are housed in the second end portion cover portion 23 housing the discharge drive unit 30.

By incorporating the discharge control unit 210, the discharge communication unit 212, and the discharge power supply 211 into the sleeve 20 side, electrical contacts with the airframe 101 are not required.

Modified Example 2

Figure 7A:
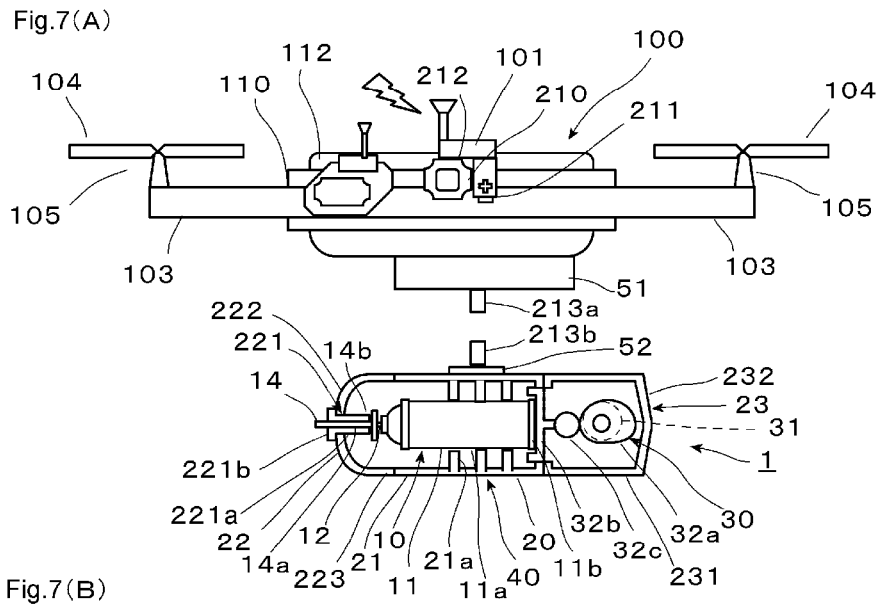
FIG. 7(A) is a front view showing a state in which the sleeve has been removed from the airframe and FIG. 7(B) is a front view showing a state in which the sleeve is coupled to the airframe.
Figure 7B:
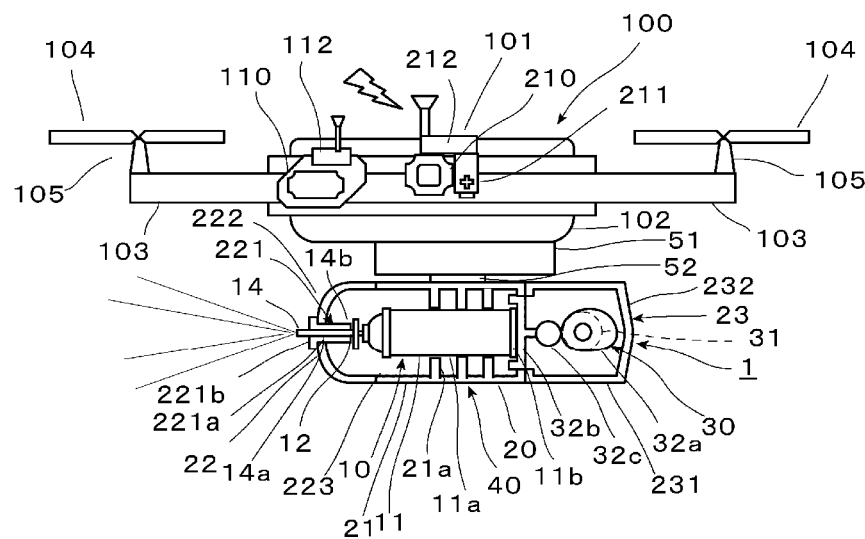

FIG. 7 shows modified example 2.

Modified example 2 is identical to the first embodiment in that the sleeve 20 is coupled detachably to the airframe 101 (viewpoint 1), the discharge drive unit 30 is on the sleeve 20 side (viewpoint 2), and the electrical equipment is on the airframe 101 side (viewpoint 4), but in terms of viewpoint 3, modified example 2 differs from the first embodiment in that the aerosol container is non-exchangeable.

More specifically, the first end portion cover portion 22 of the sleeve 20 is fixed integrally to the sleeve main body 21.

With this configuration, the aerosol container is non-exchangeable, and therefore, each time the aerosol container is used up, almost the entire device, including the discharge drive unit, is exchanged. Thus, a high degree of reliability is achieved.

Modified Example 3

FIG. 8 shows modified example 3.

Modified example 3 is identical to the first embodiment in that the sleeve 20 is coupled detachably to the airframe 101 (viewpoint 1) and the discharge drive unit 30 is on the sleeve 20 side (viewpoint 2) but differs from the first embodiment in that the aerosol container 10 is non-exchangeable, similarly to modified example 2 (viewpoint 3), and the discharge control unit 210, the discharge communication unit 220, and the discharge power supply 211 are positioned on the sleeve 20 side (viewpoint 4).

In the aerosol container assembly 40 having this configuration, all configurations, including the aerosol container 10, the discharge drive unit 30, and the electrical equipment, are incorporated into the sleeve 20, and therefore the aerosol container assembly 40 simply has to be mounted on the airframe 101. This is effective in cases where the aircraft cannot be modified, such as when the aircraft is rented out.

Modified Example 4

Figure 9A:
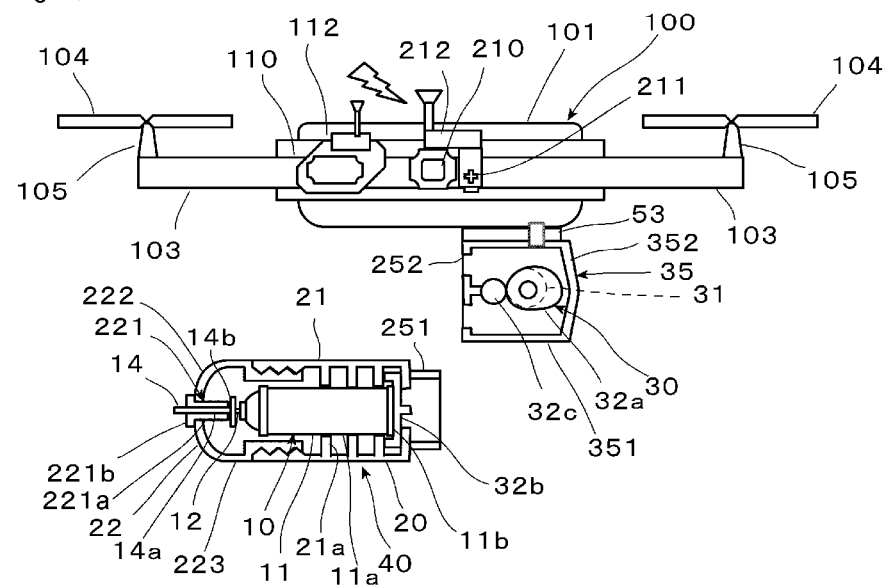
FIG. 9(A) is a front view showing a state in which the sleeve has been removed from the airframe and FIG. 9(B) is a front view showing a state in which the sleeve is coupled to the airframe.
Figure 9B:
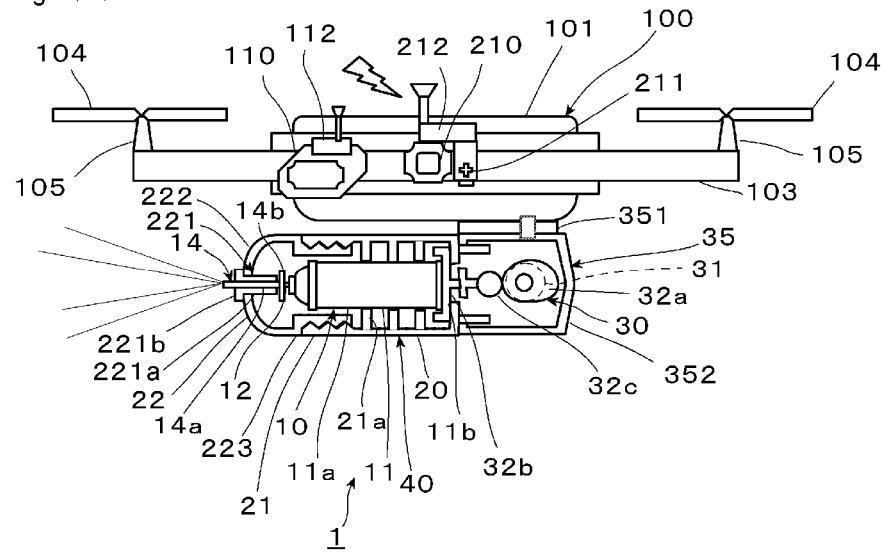

FIG. 9 shows modified example 4.

Modified example 4 is identical to the first embodiment from viewpoint 3, the aerosol container 10 being exchangeable relative to the sleeve 20, and from viewpoint 4, the electrical equipment being positioned on the airframe 101 side, but differs from the first embodiment from viewpoint 2, the discharge drive unit 30 being positioned on the airframe 101 side, and viewpoint 1, the sleeve 20 being coupled to the discharge drive unit 30 rather than to the airframe 101.

In the case of modified example 4, the sleeve 20 does not include the second end portion cover portion 23 of the first embodiment, and a casing 35 of the discharge drive unit 30 is fixed to the airframe 101. The casing 35 is basically shaped identically to the second end portion cover portion 23 of the first embodiment.

The sleeve 20 is provided with a fitting tube portion 251 serving as a sleeve-side coupling portion for coupling the sleeve 20 to the casing 35 of the discharge drive unit 30, and the casing 35 is provided with a fitting reception portion 252 serving as a casing-side coupling portion. Needless to mention, the coupling structure may be any detachable structure, and a screw engagement may also be employed.

By fixing the casing 35 of the discharge drive unit 30 integrally to the airframe 101 in this manner, there is no need to provide electrical contacts, meaning that electrical connection defects can be avoided, and as a result, the reliability improves.

Further, there is no need to house the discharge drive unit 30 on the sleeve 20 side, and therefore a cost reduction effect is acquired in relation to the sleeve 20 itself.

Modified Example 5

Figure 10A:
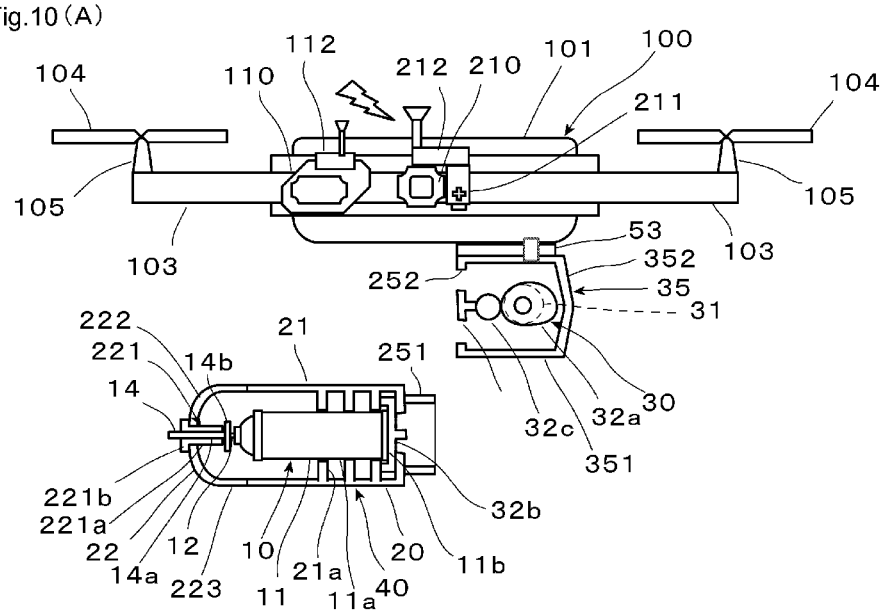
FIG. 10(A) is a front view showing a state in which the sleeve has been removed from the airframe and FIG. 10(B) is a front view showing a state in which the sleeve is coupled to the airframe.
Figure 10B:
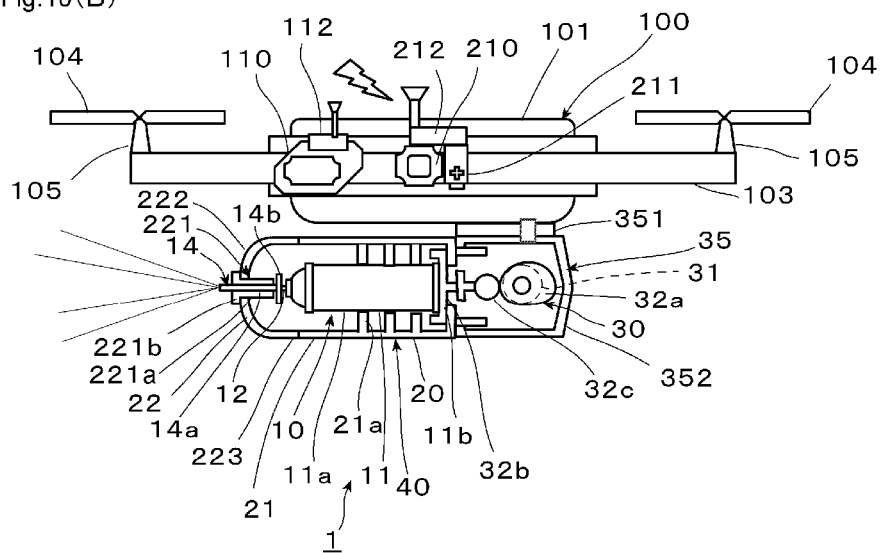

FIG. 10 shows modified example 5.

Modified example 5 is identical to the first embodiment from viewpoint 4, the electrical equipment being positioned on the airframe 101 side, but differs from the first embodiment from viewpoint 3, the aerosol container 10 being non-exchangeable, viewpoint 2, the discharge drive unit 30 being positioned on the airframe 101 side, and viewpoint 1, the sleeve 20 being coupled to the discharge drive unit 30 rather than to the airframe 101.

Likewise in the case of modified example 5, similarly to modified example 4, the sleeve 20 does not include the second end portion cover portion 23, and the casing 35 of the discharge drive unit 30 is fixed to the airframe 101. The sleeve 20 is provided with the fitting tube portion 251 serving as the sleeve-side coupling portion for coupling the sleeve 20 to the casing 35 of the discharge drive unit 30, and the casing 35 is provided with the fitting reception portion 252 serving as the casing-side coupling portion.

By fixing the casing 35 of the discharge drive unit 30 integrally to the airframe 101 in this manner, there is no need to provide electrical contacts, meaning that electrical connection defects can be avoided, and as a result, the reliability improves. Moreover, there is no need to house the discharge drive unit 30 on the sleeve 20 side, and therefore a cost reduction effect is acquired in relation to the sleeve 20 itself.

Modified Example 6

Figure 11A:
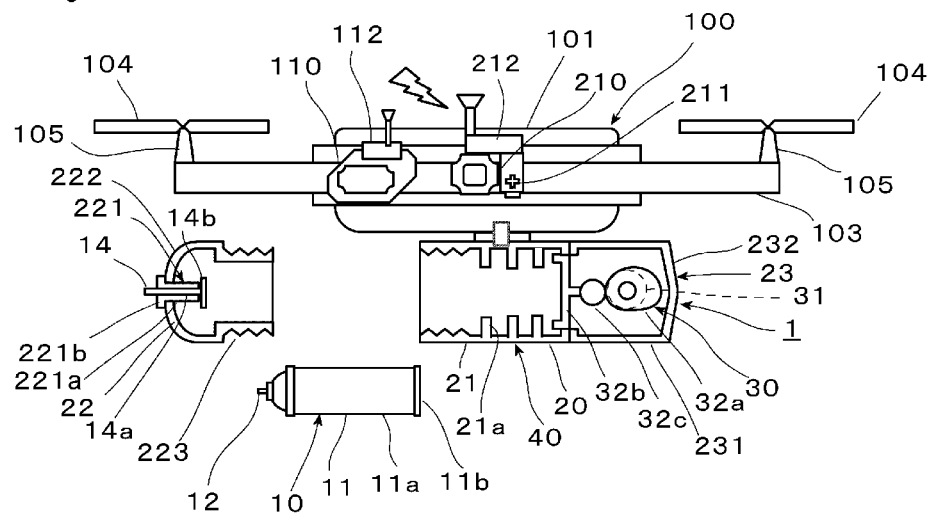
FIG. 11(A) is a front view showing a state in which the sleeve has been removed from the airframe and FIG. 11(B) is a front view showing a state in which the sleeve is coupled to the airframe.
Figure 11B:
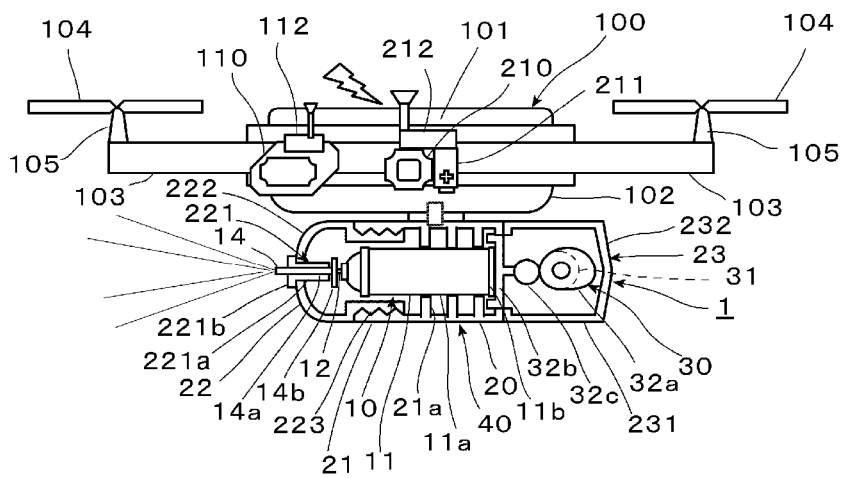

FIG. 11 shows modified example 6.

Modified example 6 is identical to the first embodiment from viewpoint 2, the discharge drive unit 30 being fixed integrally on the sleeve 20 side, viewpoint 4, the electrical equipment being positioned on the airframe 101 side, and viewpoint 3, the aerosol container 10 being exchangeable, but differs from the first embodiment from viewpoint 1, i.e., the coupling between the sleeve 20 and the airframe 101, the sleeve 20 being fixed non-detachably to the airframe 101.

Modified example 6 is effective in a case where the aerosol containers 10 that can be used are limited. Since it is only necessary to fix the sleeve 20 and the discharge drive unit 30 to the airframe 101, open the first end portion cover portion 22, and exchange the aerosol container 10 housed in the sleeve 20, a cost advantage is acquired.

Note that fixing of the discharge drive unit 30 to the airframe 101 in modified examples 4 and 5 or fixing of the sleeve 20 to the airframe 101 in modified example 6 is realized by screw fastening using a bolt or the like, fixing using a band, fixing by adhesion, and so on. Alternatively, the fixing subject components may be manufactured integrally with the airframe 101.

[Various Examples of Mounting the Aerosol Container Assembly on the Aircraft]

Figure 12A:
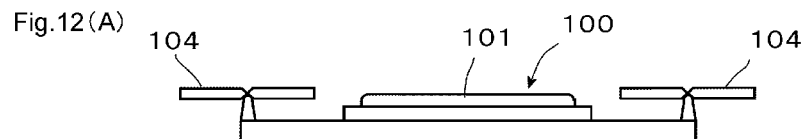
FIGS. 12(A) to 12(C) are views showing other arrangement configurations of the housing member of FIG. 1.

In the examples of the first embodiment and the first to sixth modified examples, cases in which the aerosol container assembly 40 is mounted singly were described, but a plurality of aerosol container assemblies 40 may be mounted. For example, FIG. 12(A) shows an example in which two aerosol container assemblies 40 are provided on the lower surface of the airframe. In this example, the coupling portions 51, 52 are provided for each of the aerosol container assemblies 40, but shared coupling portions may be provided, and coupling portions 51, 52 of preferred shapes are disposed in accordance with the layout of the aerosol container assemblies 40.

Figure 12B:
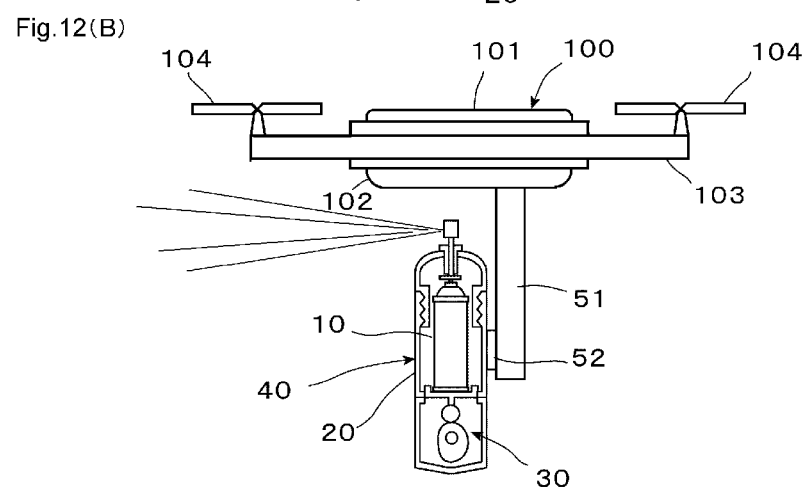
Figure 12C:
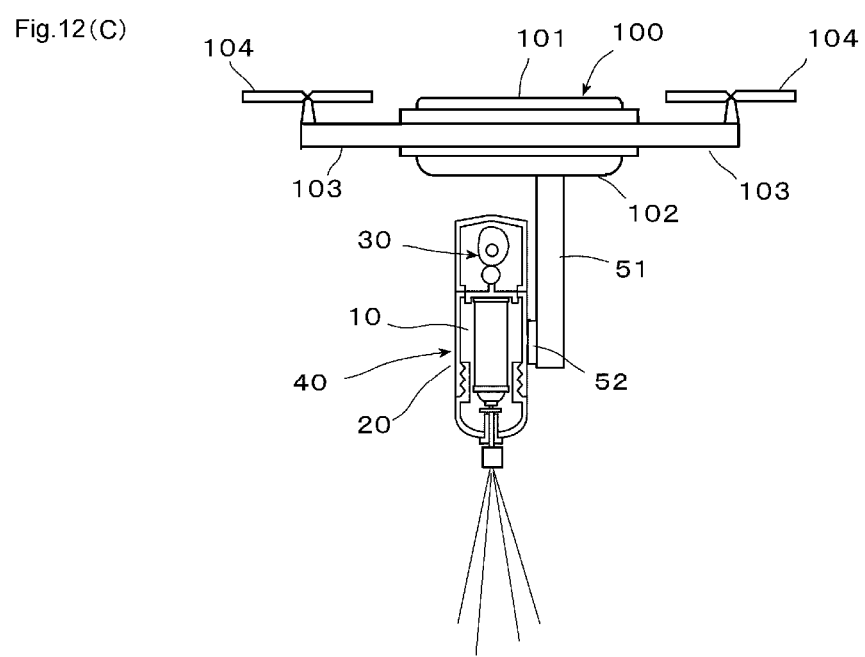

Further, the aerosol container assembly 40 is mounted with the aerosol container 10 in a horizontally oriented state, but the orientation of the aerosol container 10 may be set as desired, and by modifying the coupling portions 51, 52, the aerosol container 10 can be mounted in a desired orientation. For example, as shown in FIG. 12(B), by providing coupling portions 51, 52 that extend vertically downward from the lower surface of the airframe 101, the aerosol container 10 can be attached in a state where a center line thereof (a center line of the trunk portion) is oriented in a vertical direction. Thus, simply by exchanging the coupling portions 51, 52, the mounting layout of the aerosol container assembly 40 can be set freely. In this example, the nozzle is on the upper end such that discharge is performed sideward, but as shown in FIG. 12(C), discharge may also be performed downward.

[Various Layouts of the Aerosol Container Assembly]

Next, referring to FIGS. 13 and 14, various mounting layouts of the aerosol container assembly 40 will be described.

Figure 13A:
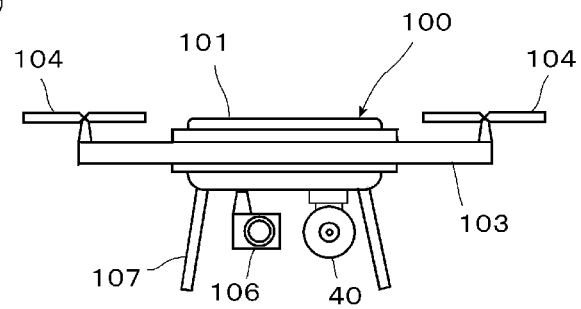
FIGS. 13(A) to 13(C) are views showing examples of mounting layouts of the housing member.
Figure 14A:
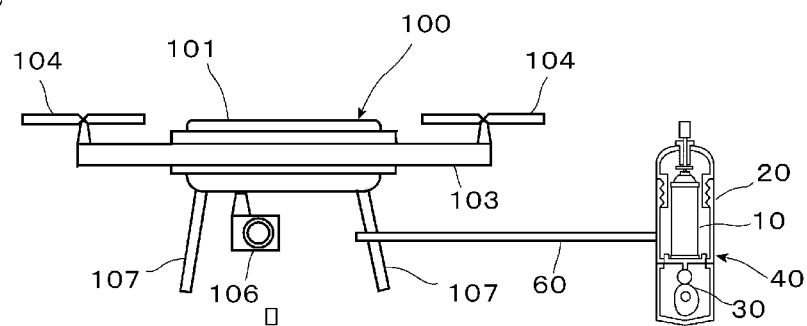
FIGS. 14(A) to 14(C) are views showing layouts in which the housing member is mounted on the airframe via an arm.
Figure 14B:
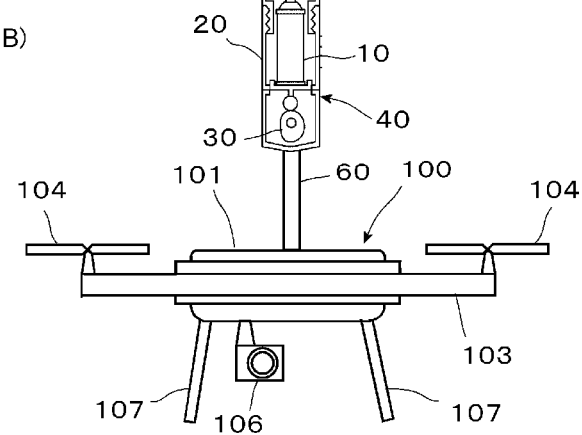
Figure 14C:
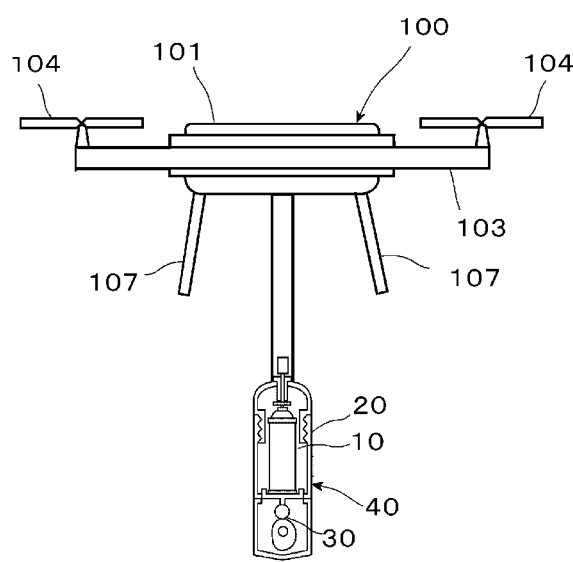

FIG. 13(A) shows an example in which the aerosol container assembly 40 is mounted on the lower surface of the airframe 101 and arranged in parallel with a mounted camera 106. A center of gravity position can be set in the center in accordance with the weight balance between the aerosol container assembly 40 and the camera 106, and thus the aerosol container assembly 40 can be disposed with stability.

Figure 13B:
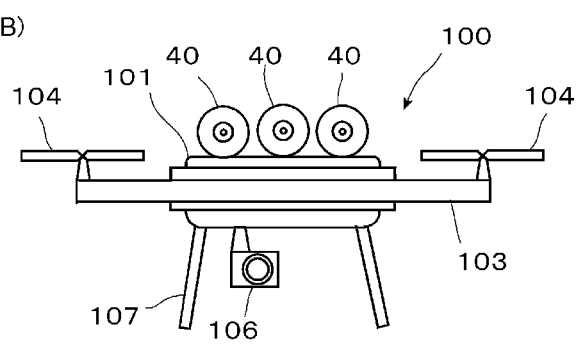
Figure 13C:
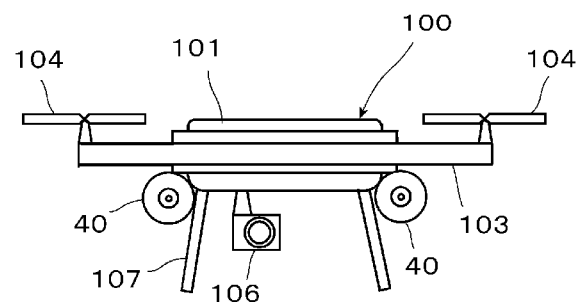

FIG. 13(B) shows an example in which a plurality of aerosol container assemblies 40 are arranged on the upper surface of the airframe 101.

In so doing, the operation to exchange the aerosol container assembly 40 can be performed easily. Further, advantages are gained in that landing of the airframe 101 is not impaired and the field of view of the camera 106 suspended from the lower surface is also not impaired.

FIG. 13(C) shows an example in which two aerosol container assemblies 40 are attached to side portions (the left and right sides in the figure) of the airframe 101.

Thus, advantages are gained in that landing is not impaired, exchange can be performed easily, and the airframe 101 can be stabilized and thereby less likely to be affected by crosswinds.

In FIG. 14(A), the aerosol container assembly 40 is mounted on a leg portion 107 of the airframe 101 via an arm 60.

In FIG. 14(B), the aerosol container assembly 40 is disposed in a position a predetermined distance above the upper surface of the airframe 101 via the arm 60.

In FIG. 14(C), the aerosol container assembly 40 is disposed in a position a predetermined distance below the lower surface of the airframe 101 via the arm 60.

By employing these arrangements, effects are acquired in that downwash from the rotary blades 104 can be avoided, distance can be secured between the aircraft 100 and a target, the risk of a collision and the occurrence of turbulence can be suppressed, the contents can be discharged into spaces that the aircraft 100 cannot enter, and so on.

Note that in the embodiment and various modified examples described above, examples in which a multicopter is used as the unmanned aircraft were described, but the aircraft may also be a fixed-wing aircraft, a rotorcraft, an air balloon, a glider, or the like.

REFERENCE SIGNS LIST

1 Discharge device
10 Aerosol container
11 Container main body
11*a* Trunk portion
11*b* Bottom portion
11*d* Mounting cap
12 Stem
12*a* Discharge flow passage
12*b* Stem hole
13 Valve
13*a* Gasket
13*b* Spring
14 Flanged actuator
14*a* Actuator main body portion
14*b* Flange portion
15 Nozzle
16 Extension tube
20 Sleeve (housing member)
21 Sleeve main body
21*a* Support portion
22 First end portion cover portion
221 Pressing member
221*a* Tubular body
221*b* End portion flange portion
222 Cover main body
223 Screw tube portion
23 Second end portion cover portion
231 Tubular portion
232 End plate
30 Discharge drive unit
31 Motor
32*a* Cam
32*b* Movable plate
32*c* Cam follower
40 Aerosol container assembly
51 Airframe-side coupling portion
51*a* T-shaped groove
51*b* Slide rail
52 Housing member-side coupling portion
52*a* Fitting convex portion

60 Arm
FIGS. 1(F) to 1(K)
70 Snap lock
71 Lock main body
72 Lever
73 Snap ring
74 Hook member
80 Hinge
FIG. 15
350 Screw feed mechanism
351 Screw shaft
352 Rotating member
353 Gear
450 Link mechanism
451 Slide shaft
452 Rotating member
453 Eccentric pin
454 Coupling pin
455 Link
456 Linear bearing

The invention claimed is:

1. A discharge device for an aircraft, to which an aerosol container can be attached, and which discharges contents of the aerosol container when attached to the aircraft, wherein the discharge device is mounted on an airframe of the aircraft in a state where the aerosol container is housed inside a housing member, wherein:

- a discharge drive unit is provided to discharge the contents from the aerosol container,
- the housing member comprises a housing member main body in which the aerosol container is housed, and a lid body for opening and closing an opening portion provided in the housing member main body, and the aerosol container can be exchanged by opening the lid body in a state where the housing member main body is attached to the airframe,
- the lid body includes the discharge drive unit and is configured to be detached from the housing member main body together with the discharge drive unit, and
- the main body is provided with an electrical contact.

2. The discharge device for an aircraft according to claim 1, wherein the discharge drive unit is configured to discharge the contents by moving a container main body of the aerosol container so that a stem projecting from the container main body is pressed into the container main body.

3. The discharge device for an aircraft according to claim 1, wherein the discharge drive unit is provided in the housing member.

4. The discharge device for an aircraft according to claim 1, wherein the discharge drive unit is provided on an airframe side.

5. The discharge device for an aircraft according to claim 1, further comprising a control device for controlling the discharge drive unit.

6. The discharge device for an aircraft according to claim 5, further comprising a communication device for operating the discharge drive unit remotely.

7. The discharge device for an aircraft according to claim 5, further comprising a power supply for driving the discharge drive unit.

8. The discharge device for an aircraft according to claim 1, wherein the discharge drive unit discharges the contents by fixing a container main body of the aerosol container, among a stem that projects from the container main body and the container main body, and pressing the stem into the container main body.

9. The discharge device for an aircraft according to claim 1, wherein the housing member and the airframe are provided with coupling portions that are coupled to each other.

10. The discharge device for an aircraft according to claim 1, wherein the housing member main body is formed in a tubular shape extending in a central axis direction of the aerosol container, and the opening portion and the lid body are provided on a head portion side and/or a bottom portion side of the aerosol container.

11. The discharge device for an aircraft according to claim 10, wherein the opening portion and the lid body are provided on the head portion side of the aerosol container, and the housing member is configured so as to open on the head portion side of the aerosol container.

12. The discharge device for an aircraft according to claim 10, wherein the opening portion and the lid body are provided on the bottom portion side of the aerosol container, and the housing member is configured so as to open on the bottom portion side of the aerosol container.

13. The discharge device for an aircraft according to claim 1, wherein the lid body is configured to be screwed to the housing member main body.

14. The discharge device for an aircraft according to claim 1, wherein the lid body comprises fixing means supported to be capable of rotating relative to the housing member main body via a hinge and that couples and fixes the lid body in a closed position.

15. The discharge device for an aircraft according to claim 1, wherein the housing member comprises a support portion that holds the aerosol container by means of a structure having a distance from a wall surface of the housing member.

16. The discharge device for an aircraft according to claim 1, wherein the lid body is provided with an electrical contact.

* * * * *